United States Patent [19]

Ingram et al.

[11] Patent Number: 4,562,556
[45] Date of Patent: Dec. 31, 1985

[54] COMPRESSIONAL AND SHEAR VELOCITY LOGGING METHOD APPARATUS

[75] Inventors: John D. Ingram; Eileen E. Macknight, both of Houston, Tex.

[73] Assignee: Schlumberger Technology Corporation, Houston, Tex.

[21] Appl. No.: 310,333

[22] Filed: Oct. 9, 1981

[51] Int. Cl.$^4$ .............................................. G01V 1/40
[52] U.S. Cl. ....................... 367/26; 367/25; 367/31; 367/27; 364/422; 181/102
[58] Field of Search ......... 367/26, 27, 29, 30, 367/31, 32, 912, 48, 49, 75; 364/422; 181/103, 102

[56] References Cited

U.S. PATENT DOCUMENTS

| 4,210,965 | 7/1980 | Ingram | 367/26 |
| 4,210,966 | 7/1980 | Ingram | 367/27 |

OTHER PUBLICATIONS

Aron et al., "Formation Compressional and Shear Interval Transit Time Logging by Means of Long Spacing & Digital Techniques", 10/78, pp. 1–11, SPE.
Piersol, "Time Delay Estimation Using Phase Data", 6/81, IEEE Transactions on Acoustics . . . , pp. 471–477.
Clay et al., "Use of a Two Dimensional Array to Receive an Unknown Signal . . . ", 2/69, Journal of the Acoust . . . , pp. 435–440.
Cheng et al., "Velocity and Attenuation from Full Waveform Acoustic Logs," 6/81, SPWLA 22nd Annual Logging Symposium, pp. 1–19.
Koerperich, "Shear Wave Velocities Determined from Long and Short Spaced Borehole Acoustic Devices," 9/79, SPE, pp. 1–12.
Plona, "Observation of a Second Bulk Compressional Wave . . . Ultrasonic Frequencies," 2/15/80. pp. 259–261, Appl. Phys. Lett.

*Primary Examiner*—Salvatore Cangialosi
*Assistant Examiner*—Ian J. Lobo

[57] ABSTRACT

Shear and compressional velocities of acoustic waveforms in the earth formations surrounding a well bore are measured by analyzing the waveforms propagated through different lengths of substantially the same formation intervals. Phase analysis techniques applied to waveforms windowed for compressional waves are used to determine the propagation velocity of the compressional waves through the differential path lengths. The waveforms are then windowed for shear waves, the discrete fourier transforms of the windowed waveforms are taken, and the cross-spectral magnitude and phase for each frequency is computed as the product of the discrete fourier transform sample of one with the conjugate of the other. Several different moveouts are calculated, the resultant phases from each analyzed, and a band specified where the zero phase moveouts are roughly consistent. This ultimately specifies a final, accurate shear window moveout for determining, using phase analysis techniques, the shear propagation velocity characteristics of the respective earth formation intervals.

22 Claims, 55 Drawing Figures

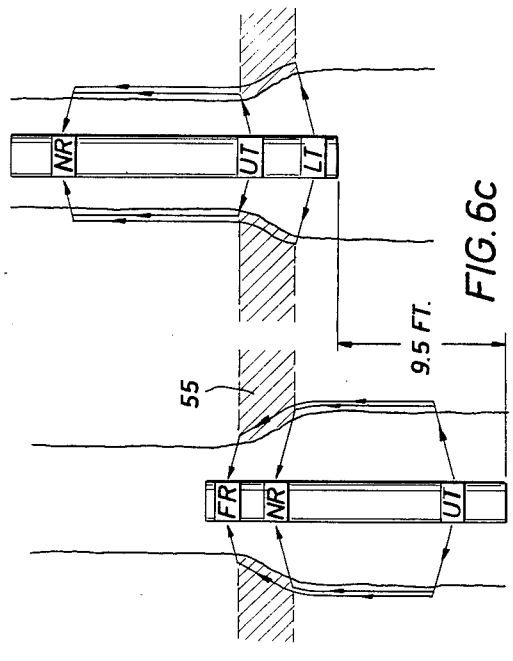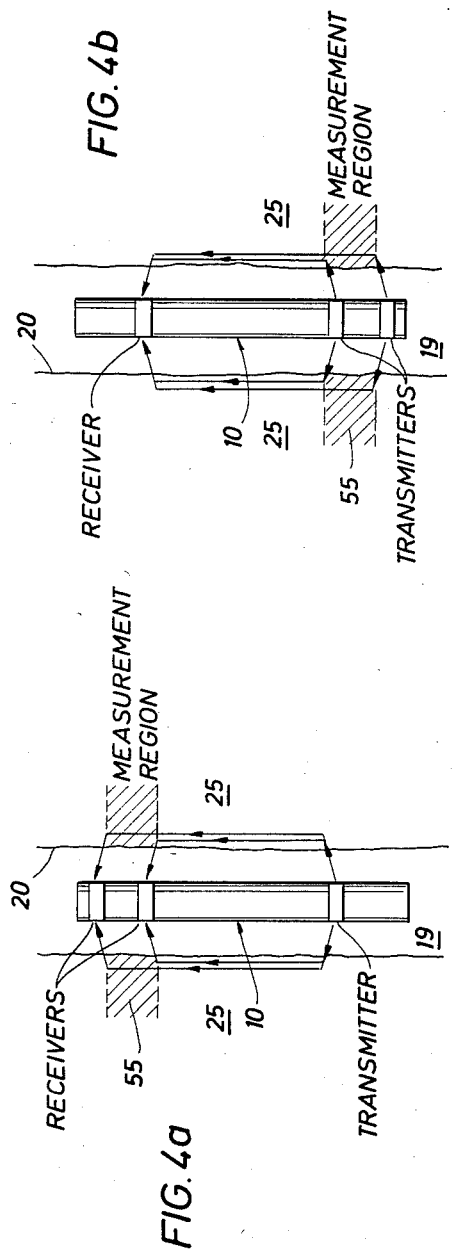

FIG.7a
MAJOR STEPS
FIG.7b
DETECTION OF FIRST ARRIVAL
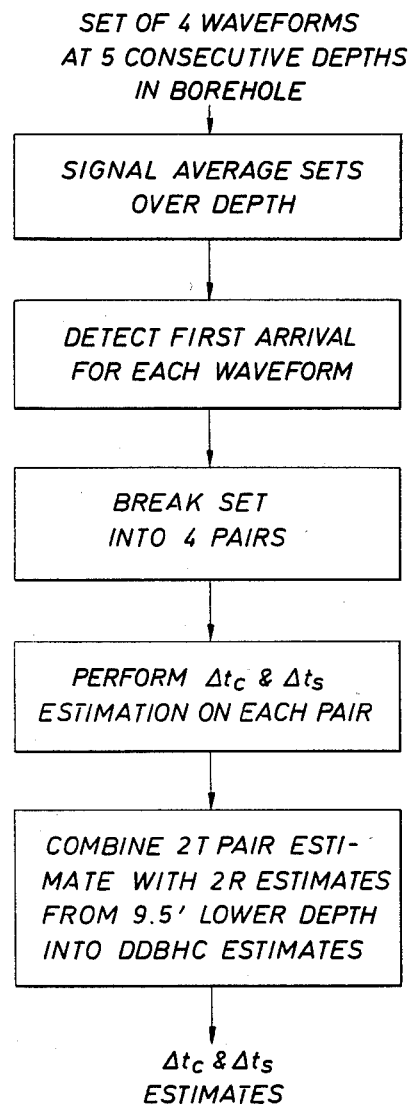
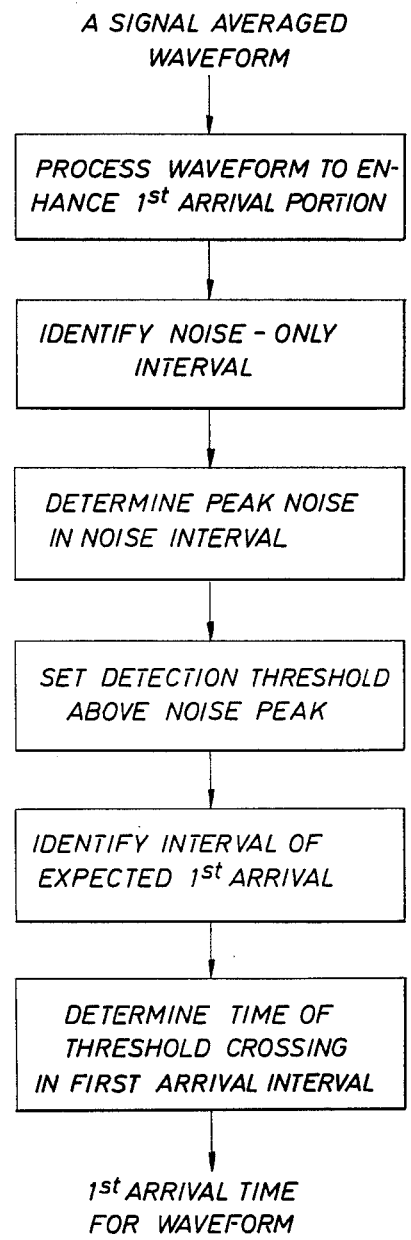

Δtc ESTIMATION FOR EACH PAIR

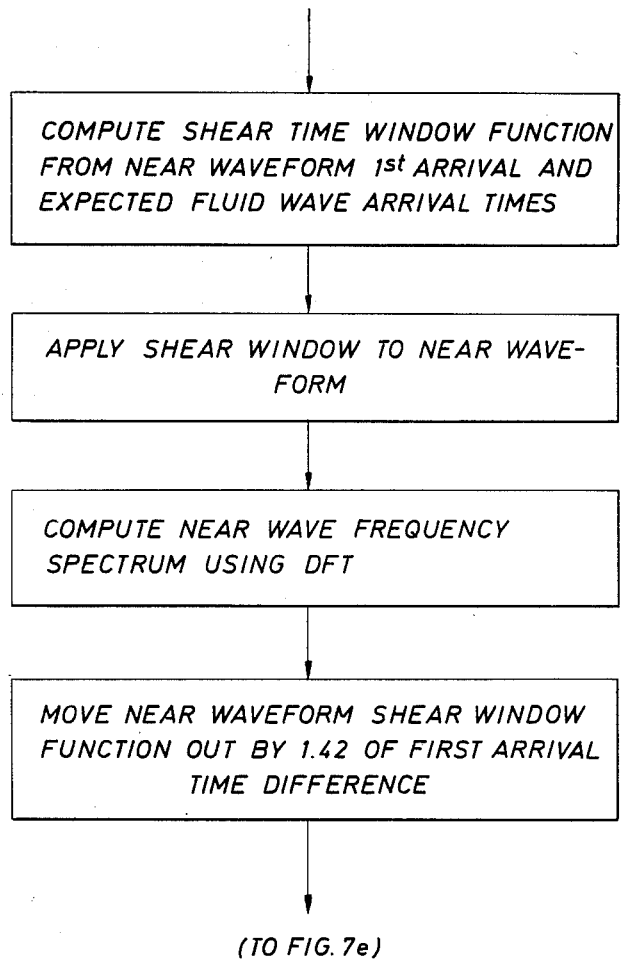
FIG.7d $\Delta t_s$ ESTIMATION FOR EACH PAIR

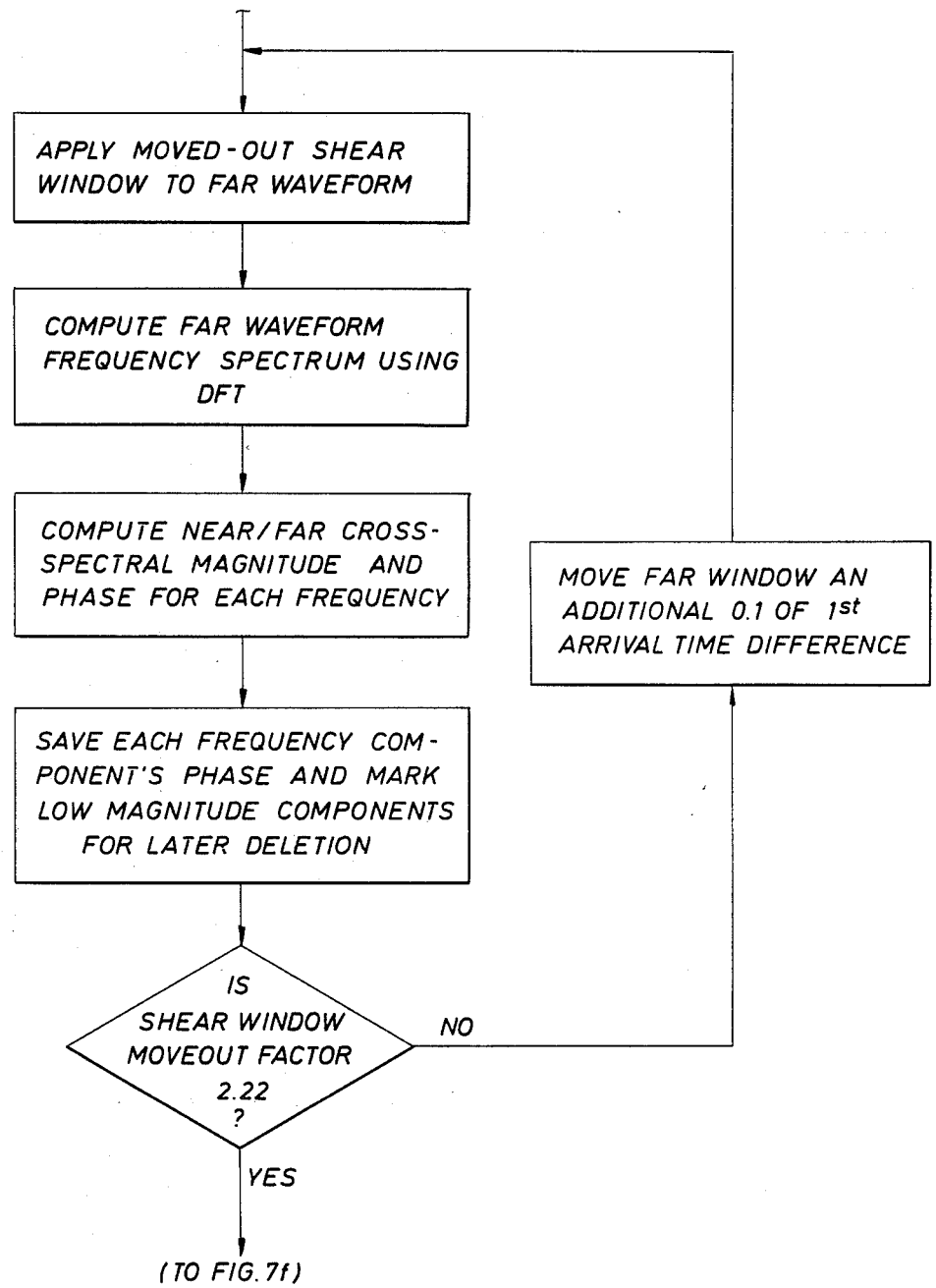
FIG. 7e  $\Delta t_s$ ESTIMATION FOR EACH PAIR (CONTINUED)

FIG.7f  $\Delta t_s$ ESTIMATION FOR EACH PAIR (CONTINUED)
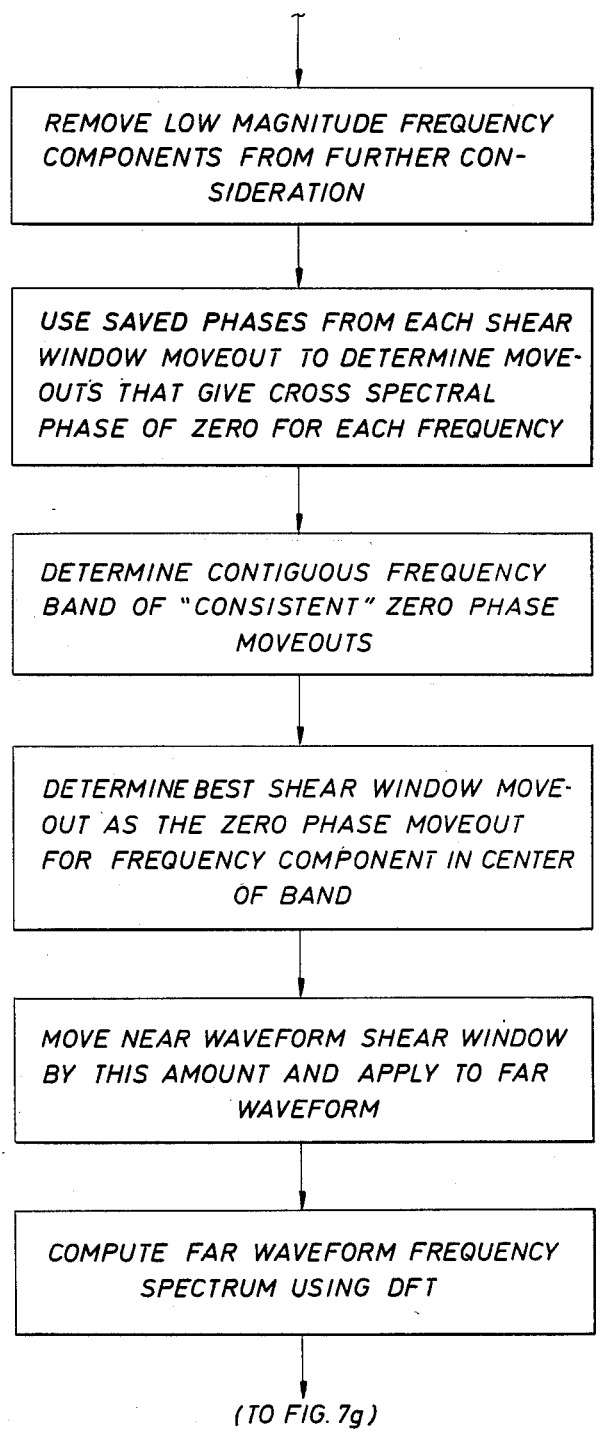
(TO FIG. 7g)

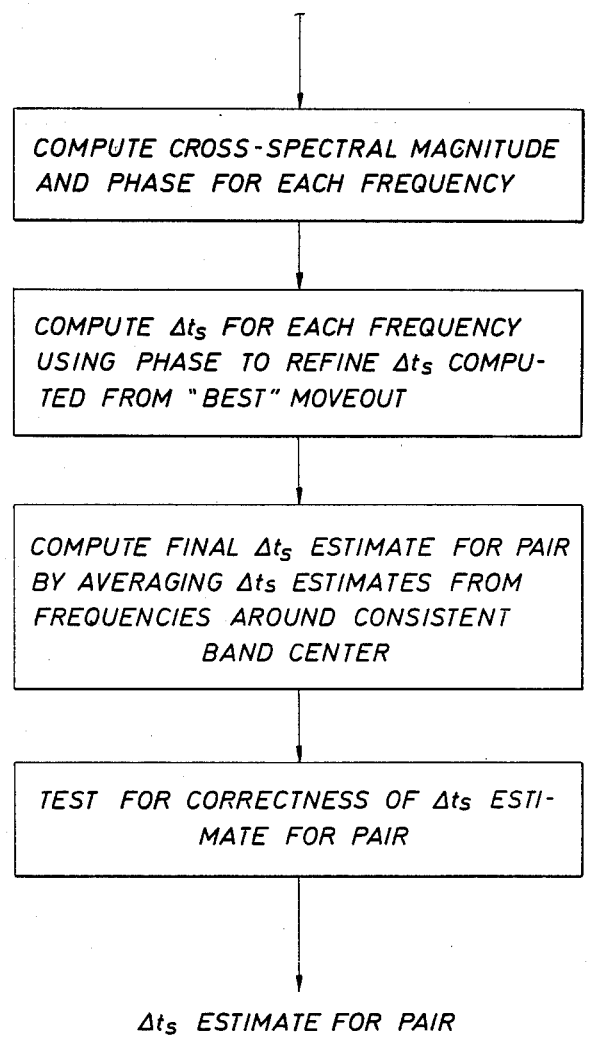
FIG.7g  $\Delta t_s$ ESTIMATION FOR EACH PAIR (CONTINUED)

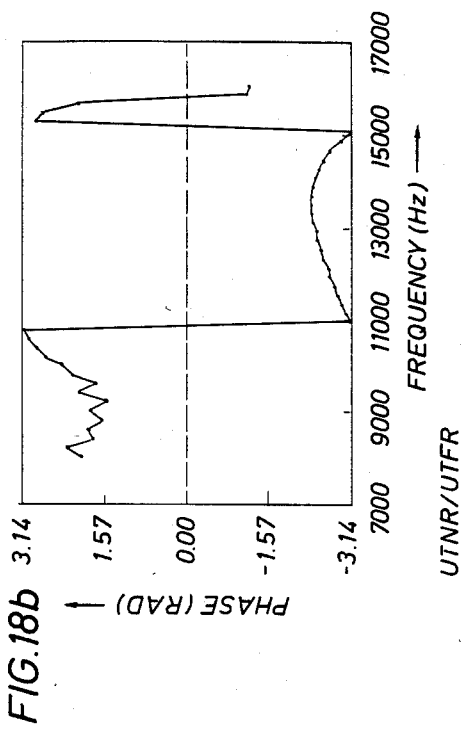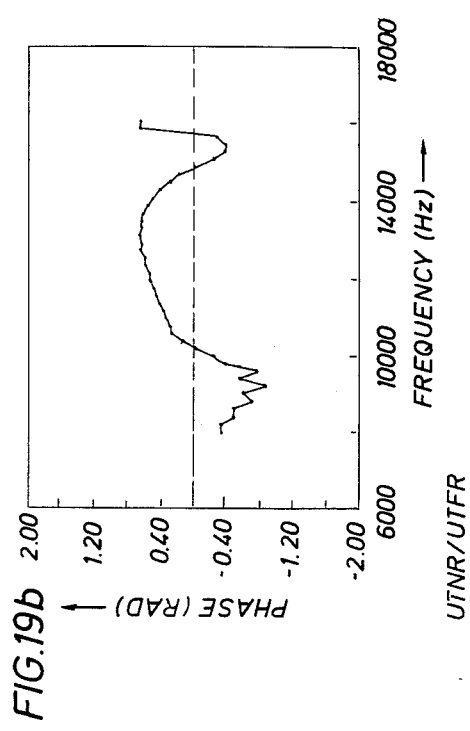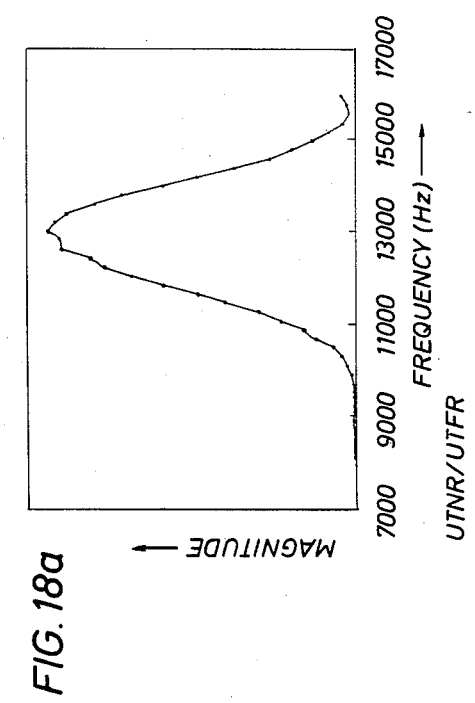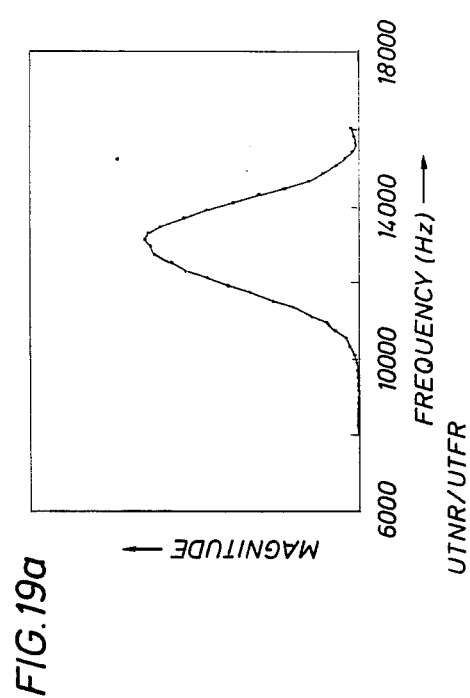

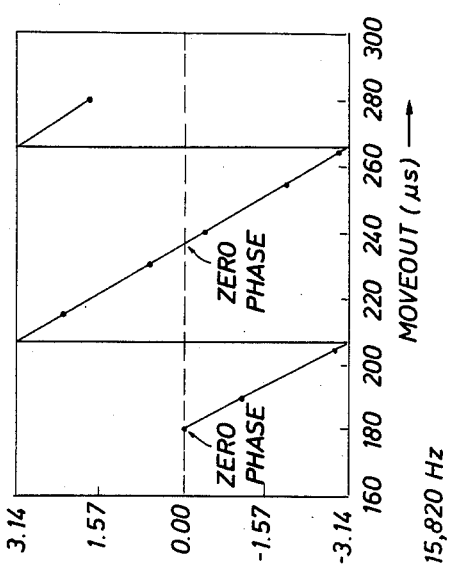
FIG.22b
FIG.22a
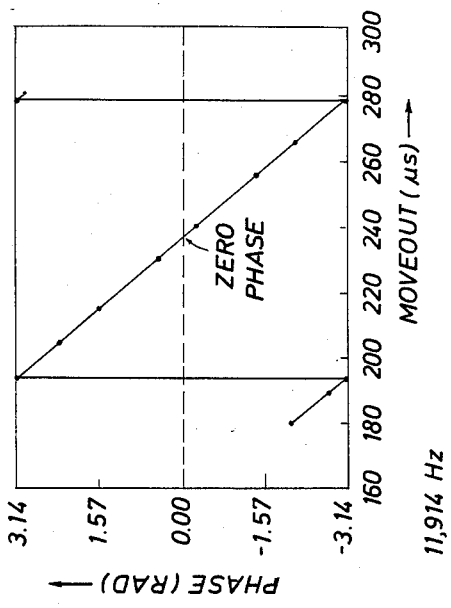
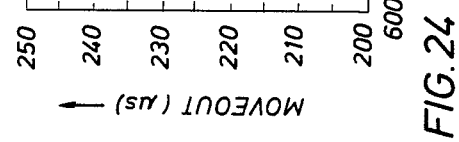
FIG.24
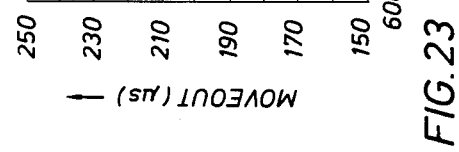
FIG.23

COMPRESSIONAL AND SHEAR VELOCITY LOGGING METHOD APPARATUS

BACKGROUND OF THE INVENTION

The present invention relates to borehole logging, and in particular to the measurement and identification of the earth formations penetrated by such a borehole, using acoustical investigation methods and apparatus.

Velocities of acoustic waves propagating in the formation around a well bore reflect a number of properties of the formation. Measurements of compressional and shear wave velocities aid in determination of such formation properties as porosity, lithology, formation fluid, and formation mechanical properties. These velocities also find use in identifying fractured zones around the borehole, and in enhancing seismological surveys.

Identifying the compressional wave and measuring its velocity is generally not difficult. It is the fastest propagating wave in the formtion, is nondispersive, and is the first to reach an array of borehole receivers when a short burst of energy from a nearby transmitter propagates through the formation. By measuring the arrival times of these waves at the receivers, the wave velocity in the vicinity of the array can be inferred.

Measuring shear velocity is considerably more difficult. Because it propagates more slowly through the formation, the shear wave arrives later in time. Therefore, its arrival is typically obscured by compressional energy, and velocity determination directly from arrival time then becomes impossible.

The prior art discloses several methods for determining acoustic wave parameters in well logging operations. One such method, first-motion detection, is particularly applicable to measuring the transit time of formation compressional waves. Another technique, multiple fold correlation, has been applied to segments of compressional waveforms detected at various spaced positions to refine the results of the first motion detection. It has also been used for determining other acoustic parameters such as the shear wave velocity (e.g., by selecting starting places deeper within the waveform). Additional techniques include pattern comparison, measurement of correspondence between waveform segments as a function of waveform locations, and, particularly in the seismological field, frequency and phase analysis to detect speed and direction of propagation.

While such methods furnish good information about the characteristics of the earth formations being measured, they generally require the use of more complex equipment. For example, multiple fold correlation typically requires more than two receivers to obtain sufficient accuracy. Many such techniques also do not work well in broad ranges of lithologies, or are difficult to interpret. A need therefore remains for a more accurate, more versatile, more reliable, and less complicated method and apparatus for compressional and shear acoustic velocity borehole logging.

SUMMARY OF THE INVENTION

The above needs are met with the method and apparatus of the present invention. In particular, a method and apparatus involving inter-receiver alignment of the shear component of the received waveforms are described. The receiver-to-receiver time shifts to line up the shear waves provide a direct indication of shear velocity.

The present invention, referred to herein as direct phase determination, involves time windowing and phase calculations for wave alignment. It uses waveforms, produced by an acoustic logging tool, whose values are sampled at regular time intervals and digitized. With a 2-transmitter, 2-receiver tool, it provides four independent measurements of the two velocities which are combined in a fashion to compensate for borehole induced errors. Each measurement requires a two waveform pair representing propagation over identical paths except for a short section of the formation. Computed velocities then characterize the average parameters of this short section.

For each pair, the compressional arrival time in both waves is first estimated and used to obtain a coarse estimate of compressional wave velocity. Then a segment of each wave in the vicinity of the first arrival is extracted using time windowing. Each segment is analyzed with the Discrete Fourier Transform (DFT) to find its frequency spectrum components in a specified band. At frequencies around the spectral peak, the difference in phase of each DFT component of the two waves is used to determine the precise wave alignment time and refine the first arrival compressional velocity estimate.

To determine the shear velocity estimate for the pair, the two waves are time windowed to extract a portion containing the later arriving shear energy. The DFT spectrum for each is again computed and the phase difference in each component is determined. The window is systematically advanced across the shear portion of one of the waves until approximately zero phase difference, indicative of wave alignment, is achieved over a band of frequencies. The remaining small phase differences are then used to determine the precise estimate for the shear wave velocity.

It is therefore an object of the present invention to provide an improved method and apparatus for measuring and determining physical characteristics of earth formations penetrated by a borehole; a method and apparatus in which the compressional and shear wave propagation velocity characteristics of acoustic waveforms transmitted through such earth formations are measured and determined; in which these characteristics are accurately measured and determined with as few as three serially spaced sonic transducers; in which the velocity can be accurately determined through the identification, from waveform outputs resulting from slightly different waveform propagation paths, of a contiguous frequency band of substantially consistent zero-phase moveouts of one waveform relative to the other; and to accomplish the above objects and purposes in an uncomplicated, versatile, reliable, and accurate method and apparatus suited for use in the widest possible range of lithologies.

Other objects and advantages of the invention will be apparent from the following description, the accompanying drawings, and the appended claims.

BRIEF DESCRIPTION OF DRAWINGS

FIGS. 4a and 4b illustrate isolation of the formation propagation wave by using receiver or transmitter pairs;

FIGS. 6a-6c illustrate depth-derived borehole compensation of acoustic velocities for changing borehole diameters;

FIGS. 7a-7g present flow diagrams for the performance of the present invention;

FIGS. 18-21 illustrate cross spectral magnitudes and phases, as in FIG. 17, for further moveouts of the far receiver waveform window;

FIGS. 22a-22b show interpolation of moveouts to produce zero phase at two different frequencies;

FIG. 23 is a plot of zero-phase moveouts determined as illustrated in FIG. 22;

FIG. 24 illustrates selection of the best moveout from the FIG. 23 data for use in the final $\Delta t_s$ determination.

DESCRIPTION OF THE PREFERRED EMBODIMENT

Figure 1:
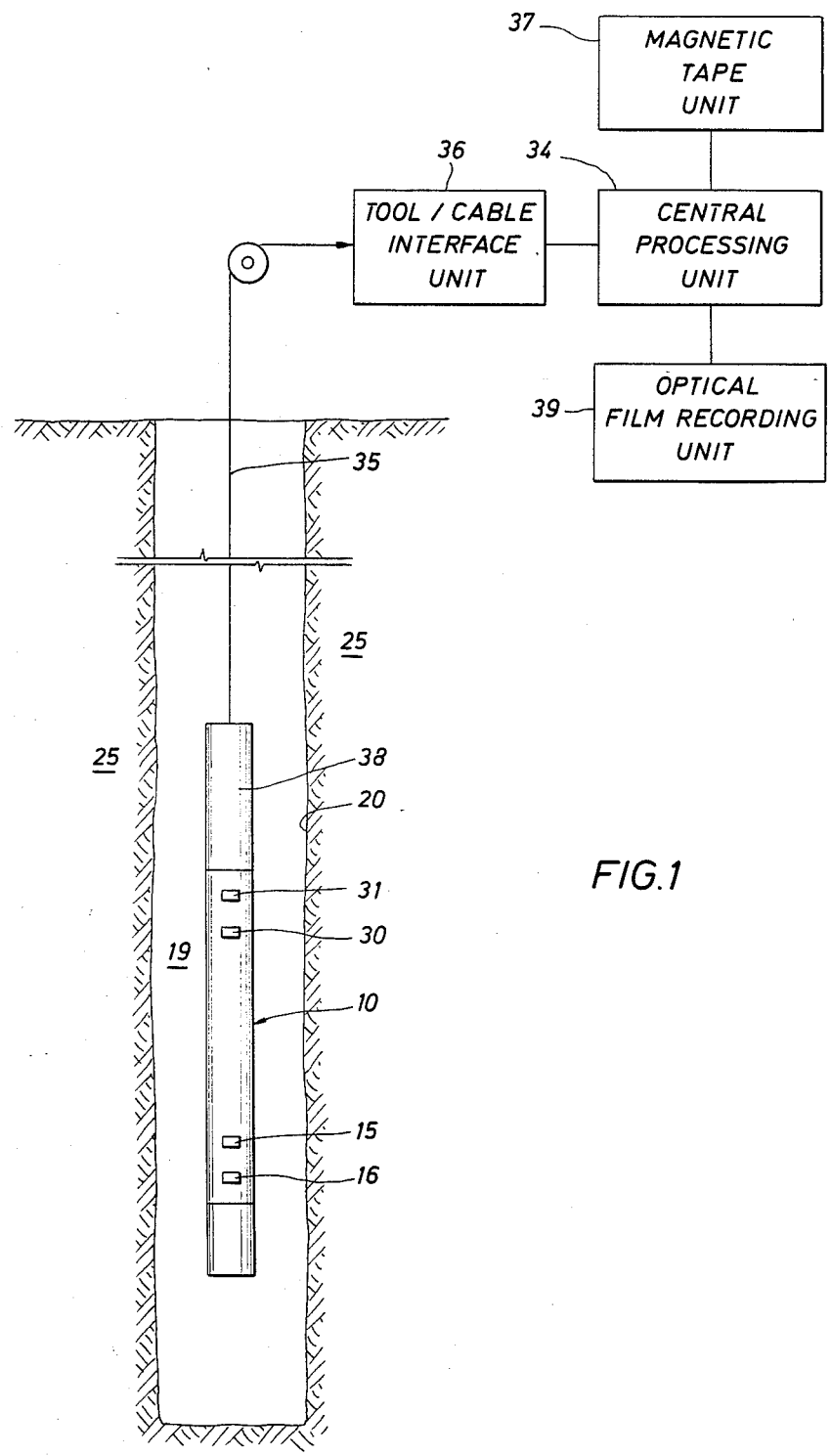
FIG. 1 is a figurative illustration of a borehole logging system according to the present invention.
Figure 1A:
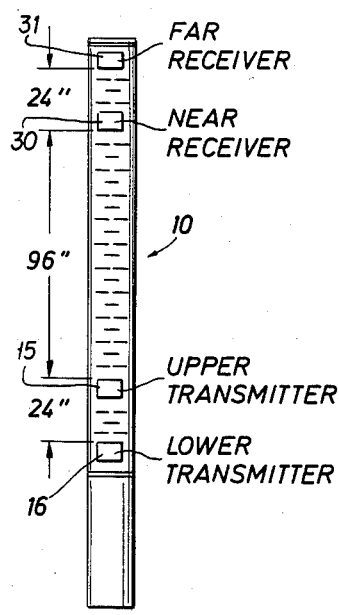
FIG. 1a illustrates in greater detail the acoustic well logging tool shown in FIG. 1.

The method and apparatus described herein may be applied to a wide class of acoustic logging tools. A diagram of a typical tool or sonde 10 is given in FIG. 1. It contains two acoustic transducers 15 and 16, called transmitters (upper and lower) used to generate acoustic energy in the form of sonic pulses in the borehole fluid 19 in a borehole 20 (FIG. 2) and surrounding formation 25. It has two additional acoustic transducers 30 and 31, used as sonic pulse receivers (near and far), for reception of acoustic energy propagating through the formation 25. The sonic pulse transmitters 15 and 16 are spaced 2 ft. apart, as are the receivers 30 and 31; the upper transmitter 15 (UT) is separated 8 ft. from the near receiver 30 (NR). Bow-string centralizers (not shown) help keep the tool 10 centered in the borehole 20.

Several times each second, on command from the surface control and processing equipment (not shown), a particular transmitter and receiver are selected and the transmitter is excited (fired). Commands are sent down the wireline cable 35 (FIG. 2) supporting the tool 10 in the borehole 20 and are decoded in an electronic cartridge 38 interconnecting the cable 35 and the sonde 10. The received waveform for each firing is amplified in the cartridge 38 and transmitted up the cable 35 to the surface equipment. The mode of transmission may be either analog or digital. If it is digital, the amplified waveform values are sampled at a regular prescribed rate, typically 100,000 or 200,000 times a second, then digitized in the cartridge. They are then telemetered up the cable as sequences of binary numbers. If it is analog, the amplified waveforms are passed directly up the cable and are digitized in the surface equipment.

The surface equipment typically includes a central processing unit, a tool/cable interface unit, a magnetic tape recording unit, an optical film recording unit, and other equipment. A program executing in the central processing unit is responsible for issuing commands to the tool through the tool/cable interface unit, for selecting the particular transmitter 15 or 16, receiver 30 or 31, and for firing the tool. It also retrieves the waveform data either from a telemetry module in the tool/cable interface unit, if digitization is done downhole, or from a digitizer module in the interface unit, if analog transmission is used. In either case, these waveform data are recorded using the magnetic tape unit. The program may actually process the waveform data at the wellsite using the direct phase determination technique described herein and record the resulting compressional and shear velocities using the optical film recording unit. Otherwise, processing is performed by a central processing unit located in a remote center using the tapes of waveform data.

When one of the transmitters 15 or 16 is electrically excited, it emits an oscillatory burst of acoustic energy in roughly a 10 kHz to 30 kHz frequency band. This burst begins to propagate more or less spherically outward from the transmitter as a compressional (pressure) wave in the borehole fluid 19. As the wave passes into the formation 25, its direction of propagation changes as the refracted ray diagrams of FIG. 2 indicate, and its speed increases to that of sound in the specific rock composition. At the same time, some of the energy is converted into shear waves (shown as dashed rays) 42 propagating in the formation 25 but at a velocity lower than compressional.

The waves of interest here are the compressional and shear waves 40 and 42 that travel along the borehole wall just inside the formation. As they propagate, these waves continually couple energy back into the fluid 19 in the form of compressional waves. At the same time, some of the transmitted energy never enters the formation but propagates directly in the fluid, as at 40a, guided by the borehole and tool at speeds near that of sound in an unbounded fluid.

Figure 3:
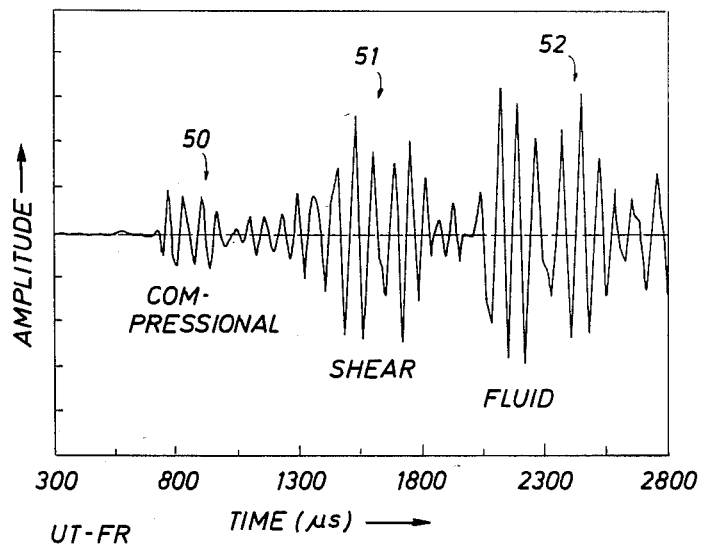
FIG. 3 illustrates a typical received waveform.
Figure 5B:
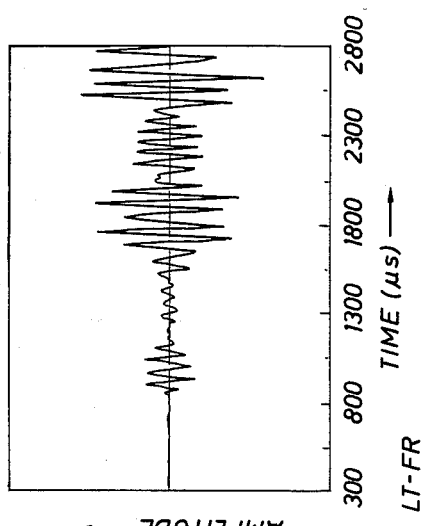
FIGS. 5a-5d show waveforms sent through the same formation interval between different transmitter/receiver pairs.
Figure 5D:
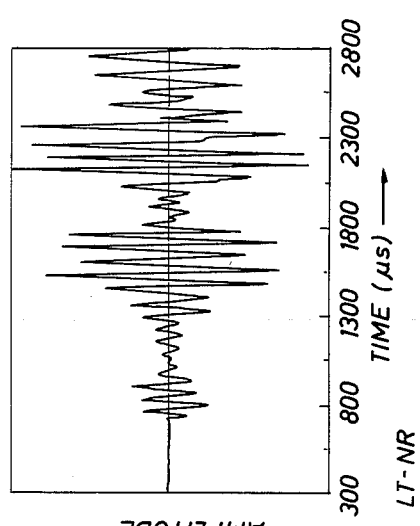
Figure 5A:
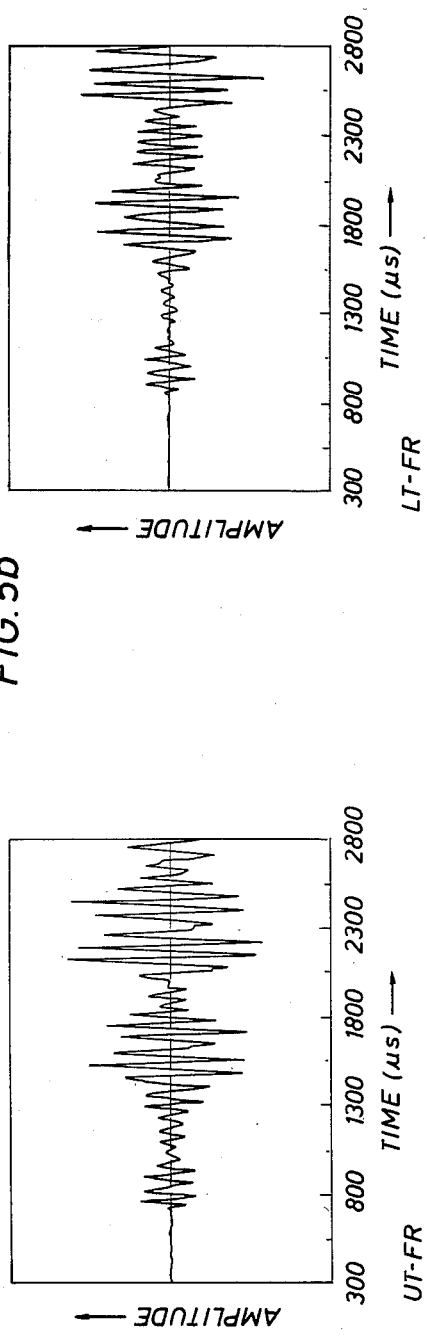
Figure 5C:
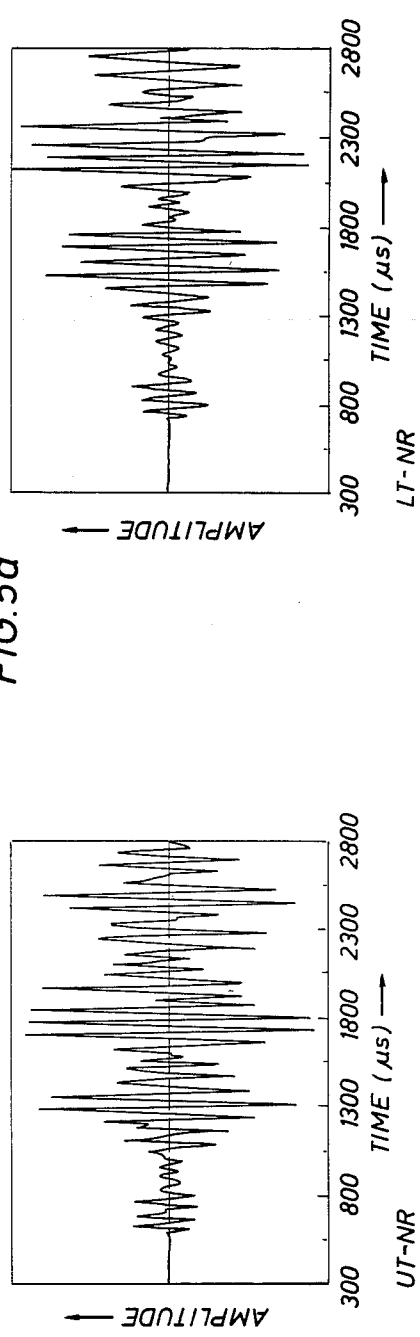

There are, therefore, three means for acoustic energy to propagate from transmitter to receiver: through fluid, then formation, then fluid, all as compressional (e.g., waves 40); through fluid as compressional, then formation as shear (e.g., waves 42), then fluid as compressional; and completely through fluid (e.g., 40a) guided in the borehole. The formation compressional travels the fastest and thus is first to arrive at the receiver. The fluid wave 40a is usually last to arrive, and the shear somewhere in between. FIG. 3 displays a typical received waveform from a 10 ft. transmitter-receiver spacing; the three components, compressional wave 50, shear wave 51, and fluid wave 52, are clearly evident. The time scale gives time in microseconds ($\mu S$) following transmitter excitation.

Of interest are the compressional and shear wave velocities in the rock formation. Travel times from a single transmitter to a single receiver, however, include some fluid propagation as well as formation. Isolation of just the formation propagation requires two waveforms taken over slightly different paths. This is accomplished by using either one transmitter and two receivers (FIG. 4a) or two transmitters and one receiver (FIG. 4b). As seen in FIG. 4a, the only difference in travel path between the transmitter and each receiver is in the measurement region 55 of the formation 25 between the receivers 30 and 31. The differential propagation time then reflects the average acoustic velocity in this part of the formation. Similarly in FIG. 4b, the differential propagation time between each transmitter and the receiver is determined by the acoustic velocity of the formation between the transmitters 15 and 16.

Figure 2:
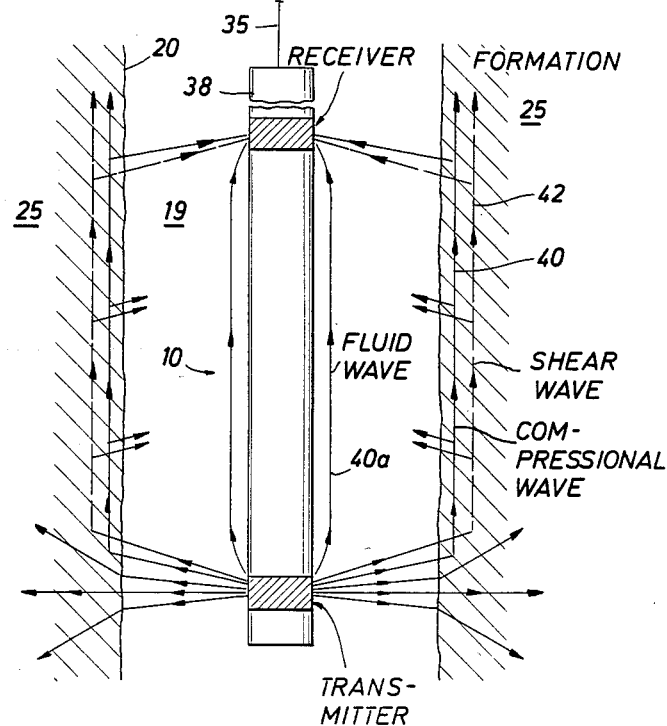
FIG. 2 is a refracted ray diagram depicting propagation of the acoustic waves in the borehole and the adjacent earth formations.

For the tool illustrated in FIG. 1, the 2-transmitter, 2-receiver combination provides four independent measurements of formation velocity. The UTFR-UTNR (upper transmitter/far receiver—upper transmitter/near receiver) and the LTFR-LTNR combinations yield two independent measurements of the velocity in the formation between the receivers, whereas the LTNR-UTNR and LTFT-UTFR combinations give that between the transmitters. FIGS. 5a–5d illustrate a set of waveforms (UT-FR, LT-FR, UT-NR, LT-NR, respectively) typical of this tool. The differences in arrival time of the compressional, shear, and fluid waves due to the differences in travel paths are evident.

In practice, the velocities are actually measured and reported as interval travel times (the reciprocal of velocity). These are determined as the differential travel times divided by the differential path lengths and termed $\Delta t$. The unit "microseconds per foot" ($\mu S/ft$) is used.

The above method for determining $\Delta t$ from two waveforms works well when the total travel paths through the fluid for each have the same length (e.g. FIG. 4). But when the two receivers are traversing a section where the borehole diameter is changing, this may no longer be true. In the case shown in FIG. 6a, the travel path from the formation to the near receiver is longer than that from the formation to the far receiver. Thus the 2-receiver $\Delta t$ value will be lower than the correct value for the formation by an amount proportional to the fluid path difference. Later, when the two transmitters traverse that section, the fluid path difference causes $\Delta t$ computed between transmitters to be too large by the same amount. If a 2-transmitter $\Delta t$ is averaged with a 2-receiver $\Delta t$ representing the same two-foot measurement section 55 of the formation, therefore, the errors in each will be cancelled, yielding the correct $\Delta t$ value. This process, called depth-derived borehole compensation, is considered "depth-derived" sine the two compensating $\Delta t$ measurements are separately made at times when the overall tool is at different depths (see FIG. 6c). The difference in tool depths required for each $\Delta t$ appears to be 10 ft. The slight inclination of the travel path in the fluid, however, reduces this difference to 9.5 ft., as shown in FIG. 6c.

The preferred method and apparatus for direct phase determination described herein analyzes four waveforms acquired at intervals of 0.5 ft. in the well. At each 0.5 ft. depth point, each of the waveforms is signal averaged with waveforms acquired from the two depth points just above and two points just below, and then processed to determine compressional first arrival time. These serve as inputs into a pairwise analysis of the waveforms, as follows:

TABLE 1

| Pair | Waveform Pairings | |
|---|---|---|
| | Near Waveform | Far Waveform |
| 1 | UTNR | UTFR |
| 2 | LTNR | LTFR |
| 3 | UTNR | LTNR |
| 4 | UTFR | LTFR |

The first two pairs, each involving both receivers but only one of the two transmitters, produce 2-receiver estimates for compressional and shear $\Delta t$. The other two pairs use only one of the two receivers and both transmitters to produce 2-transmitter $\Delta t$ estimates. Each pair is first analyzed to find compressional $\Delta t$. The resulting estimate is then tested for acceptability before proceeding. If the estimate is acceptable, the shear analysis is undertaken next. The shear $\Delta t$ value is also tested before being accepted. All good pairwise estimates are then combined into a final depth-derived borehole compensation $\Delta t$ value.

Figure 7C:
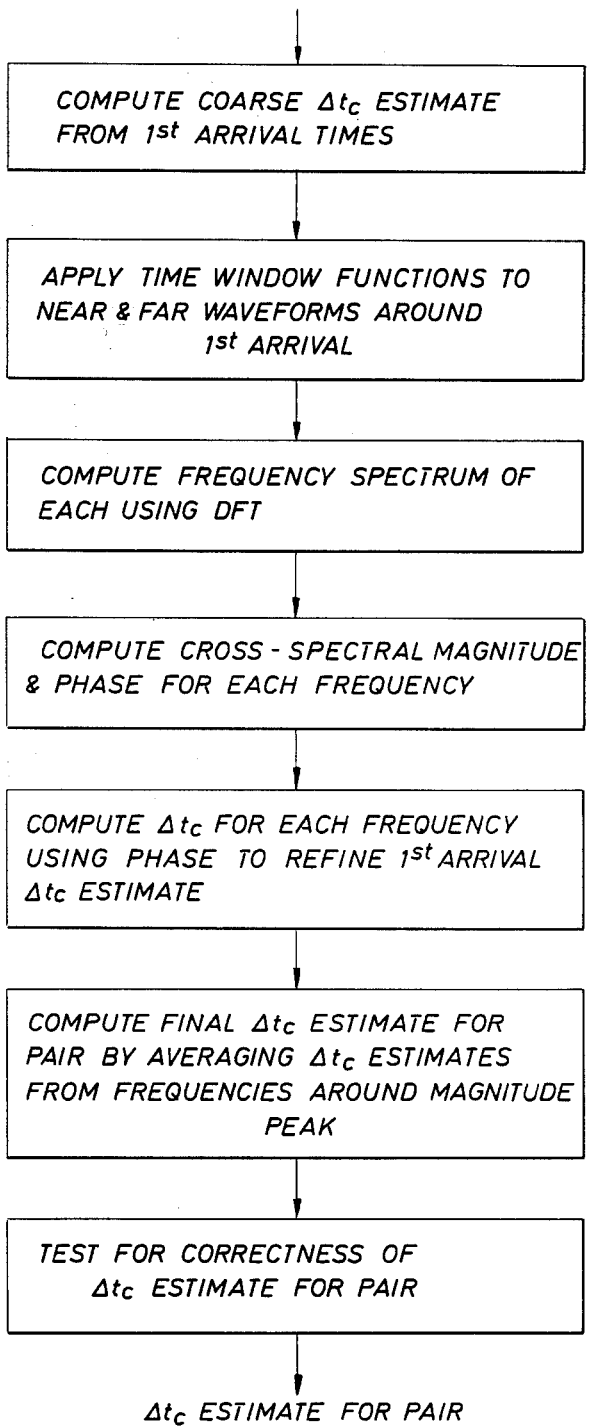

An abbreviated flow diagram for the direct phase determination method and apparatus of the present invention is given in FIG. 7. The details of each step in the procedure are described below.

To help make these descriptions more clear, a single example is developed, illustrating results typical of each step. Four waveforms are used, one for each transmitter-receiver combination and all taken with the tool at one position in the borehole. Here, the four waveform values are sampled every 5 $\mu S$ (200,000 times per second) beginning 300 $\mu S$ after transmitter firing. There are 512 sample values covering the 305–2860 $\mu S$ interval of the received waveforms. The borehole diameter is approximately 6.5 inches.

The signal averaging is the first step in processing the waveforms used for compressional and shear $\Delta t$ estimation. This process enhances the coherent acoustic wave arrivals in relation to the incoherent background noise and is performed separately on waveforms from each transmitter-receiver combination. Here, the waveforms obtained for a given transmitter-receiver combination over a 2 ft. interval in depth are combined to form an "averaged" waveform. Since waveforms are typically available for each 0.5 ft. of depth in the well, this means that five waveforms are combined. In mathematical terms, the ith time sample value of a given transmitter-receiver's signal averaged waveform, $s(t_i,D)$, for a depth, D, is $$s(t_i,D) = A1 \cdot w(t_i,D - 1) + A2 \cdot w(t_i,D - 0.5) + A3 \cdot w(t_i,D) + \quad (1)$$

$$A2 \cdot w(t_i,D + 0.5) + A1 \cdot w(t_i,D + 1)$$

where $w(t_i, .)$ represents the ith time sample of the original waveform at the given depth and the weights A1, A2, and A3 are determined from a five-point Hamming window function as

A1 = 0.035714
A2 = 0.241071
A3 = 0.446429

FIG. 5 illustrates a typical set of signal averaged waveforms and will be used in the example throughout this description.

The next step in the procedure is to determine, for each waveform, the time at which compressional wave energy first reaches the receiver. The more-or-less continuous acoustic background noise created by tool motion in the borehole interferes with the process of locating the true first arrival. Even though signal averaging helps to reduce noise effects, determining first arrival is still often difficult. Consequently, each waveform must be additionally processed to further enhance the signal in relation to the noise.

This signal enhancement is accomplished by constructing samples of a new waveform from sample values of the signal averaged wave. Each processed sample is determined as follows:
1. Sum the signal averaged wave sample values at the three previous sample times.
2. Skip ahead either four sample for sampling intervals of 5 μS or less, three for intervals greater than 5 μS but less than 10 μS, or none for intervals greater than 10 μS.
3. Subtract each of the next three samples of the signal averaged waveform from the sum formed in step 1.

This process is repeated to obtain processed waveform samples for each of the four signal averaged waves. Mathematically, the ith time sample of a given transmitter-receiver's processed wave, $p(t_i)$, is computed as $$p(t_i) = s(t_{i-3}) + s(t_{i-2}) + s(t_{i-1}) - \quad (2)$$
$$s(t_{i+K}) - s(t_{i+K+1}) - s(t_{i+K+2})$$

for every $t_i$ in the sampled waveform, where $s(t_i)$ is the ith time sample of the original, signal averaged waveform and K is 4, 3, or 0 from step 2 above.

Figure 8A:
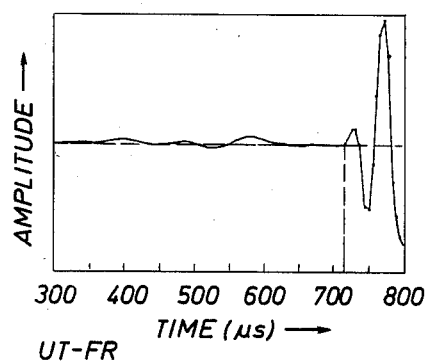
FIGS. 8a-8b show, respectively, the original and the signal averaged portions of the FIG. 5 waveform up to and including the first arrival.
Figure 8B:
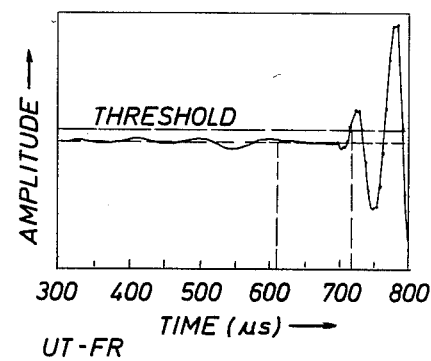
Figure 9A:
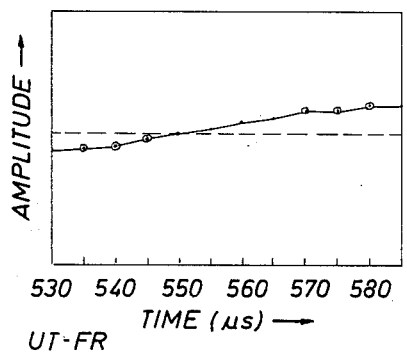
FIGS. 9a-9d show in greater detail the method by which the enhanced waveform of FIG. 8b is computed.
Figure 9B:
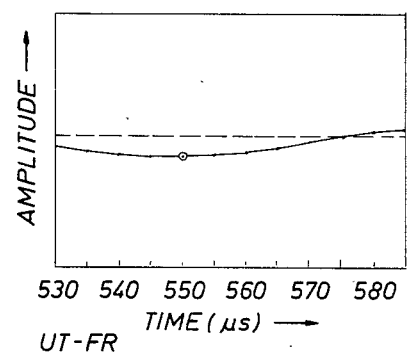
Figure 9C:
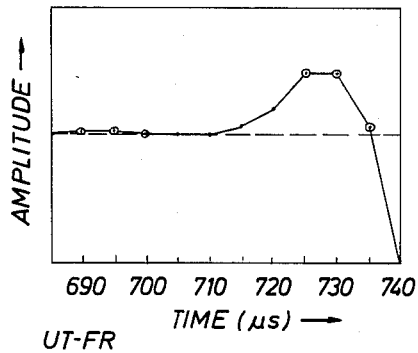
Figure 9D:
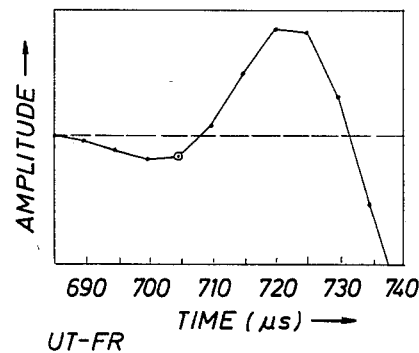

When the UTFR waveform of FIG. 5 is processed in this fashion, the waveforms shown in FIGS. 8 and 9 result. FIG. 8a shows the portion of the UTFR wave up to and including the first arrival; FIG. 8b has the processed results. A closer look at the computation of the processed wave value at two different times is illustrated in FIG. 9. Samples of the original waveform shown circled in FIG. 9a are used to compute the processed wave sample value circled in FIG. 9b at 550 μS. Similarly, the processed sample computation at 705 μS circled in FIG. 9d is computed from the samples indicated in FIG. 9c. (Recall that the sampling interval here is 5 μS, so four samples in between are skipped.) The first arrival amplitude enhancement relative to the noise level in the processed wave is apparent when FIG. 8b is compared to FIG. 8a.

The next step is to identify a time interval before first arrival that is composed of noise only. Several factors determine the size of this interval. The interval begins with the first sample time that is at least 200 μS after transmitter firing. (In the example, sampling begins at 305 μS so this becomes the beginning of the noise interval.) It will be at least 50 μS in duration. Normally, the interval ends with the sample time 100 μS before the wave is expected to arrive. Expected arrival is predicted from the arrival time measured in the waveform from the same transmitter-receiver pair at the last processed depth. Should this time precede the arrival time of a wave traveling 38 μS/ft. in the formation, the interval will be extended to the later time. The 38 μS/ft. wave travel time includes propagation from transmitter to formation at an assumed 200 μS/ft. for fluid, through the formation from transmitter to receiver at 38 μS/ft., and from formation to receiver again at 200 μS/ft. For borehole and tool diameters of 6.5 and 3.625 inches respectively, a 38 μS/ft. wave will arrive at a receiver spaced 10 ft. from the transmitter 428 μS after transmitter firing. In the UTFR example, however, the predicted first arrival is 710 μS, so the interval ends at 610 μS. The noise interval covers 305 μS to 610 μS, as is marked in FIG. 8b.

Within this noise interval, the largest processed sample value magnitude is found and taken as the peak noise amplitude. If this amplitude exceeds 250 amplitude quantization units, the wave is considered too noisy for further processing. If not, this noise amplitude is multiplied by 1.75 and used as a detection threshold level in the next step. Should this level be less than 16 units, a minimum threshold of 16 units will be used. In the example the largest noise sample value occurs at 550 μS and has a value of −49 units. A threshold of 89 units is established as shown in FIG. 8b.

Finally, a detection interval is determined within which the arrival is expected. This interval begins at the end of the noise interval and lasts long enough to include compressional waves traveling as slow as 180 μS/ft. The arrival time of this 180 μS/ft. wave is computed in the same manner as that of the 38 μS/ft. wave dicussed earlier. This is 1848 μS in the example. The time of first arrival is taken as the time a sample value of the processed wave first lies above the threshold. For the UTFR example this occurs at 715 μS, as marked in FIG. 8a. Likewise for the other three waveforms in FIG. 5, the first arrivals are determined to be at 590 μS for the UTNR, 840 μS for the LTFR, and 715 μS for the LTNR. Should no threshold crossing be found, however, the signal is considered too weak for further analysis.

As stated earlier, compressional and shear velocity estimates are computed for each of the waveform pairs of Table 1. The steps for determining $\Delta t_c$ and $\Delta t_s$ for any one of these pairs will now be given. In the description that follows, the UTNR-UTFR pair is selected as an example. Results of the three other pairs are typically very similar to this.

An initial estimate of compressional $\Delta t$ is made from the first arrival times for the two waveforms using the expression $$\Delta t_{c1st} = (T_{far1st} - T_{near1st})/S \quad (3)$$

where $T_{near1st}$ and $T_{far1st}$ are the first arrival times for the near and far waves and S is the two-foot difference in near-far path lengths. Since waveform sampling takes place at periodic discrete times rather than continuously, each arrival time is determined only to the time of the nearest sampling point or value, which is an integral multiple of the sampling interval. This first arrival time estimate will, therefore, be a multiple of half of the sampling interval. This is but a coarse estimate of $\Delta t$ which serves as a starting point for further calculations.

For the UTFR-UTNR pair in FIG. 5, for example, the arrival times are 550 μS and 715 μS, respectively, so $\Delta t_{c1st}$ is 62.5 μS/ft.

If first arrival detection has failed with one or both of the waveforms, the process is unable to continue with the analysis of this pair. Therefore, there will be no contribution from this pair to the final compressional and shear Δt estimates.

To determine a much more accurate final $\Delta t_c$, the portion of each waveform from 100 μS before first arrival to 300 μS afterward is selected for further analysis. This process of retaining a section of the waveform and discarding the rest is known as windowing. It is accomplished by multiplying the samples, $s(t_i)$, of a waveform by a window function, $h(t_i - t_{strt})$, to form $$x(t_i - t_{strt}) = h(t_i - t_{strt}) \cdot s(t_i) \tag{4}$$

for $t_{strt} \leq t_i \leq t_{end}$, where $x(t_i - t_{strt})$ represents the windowed waveform samples and $t_{strt}$ is the starting time of the windowed interval. Note that the windowed waveform is preshifted in the process to a starting time of zero. A Hanning window function given by $$h(t_i - t_{strt}) = 0.5 - 0.5 \cos(2\pi(t_i - t_{strt})/(t_{end} - t_{strt})) \tag{5}$$

for $t_{strt} \leq t_i \leq t_{end}$, and zero elsewhere is used here. For compressional analysis, $$t_{strt} = T_{1st} - 100 \text{ μS}$$

and $$t_{end} = T_{1st} + 300 \text{ μS}.$$

Figure 10A:
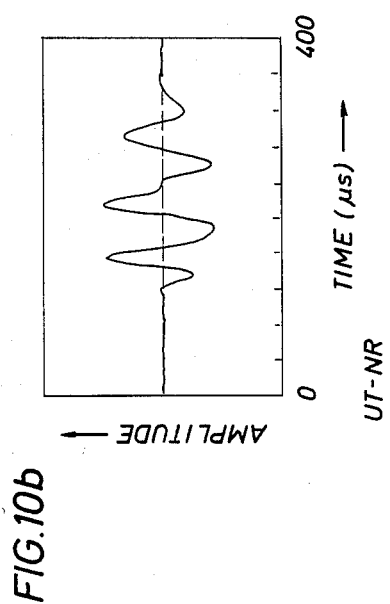
FIGS. 10a-10d illustrate windowing of the waveforms.
Figure 10B:
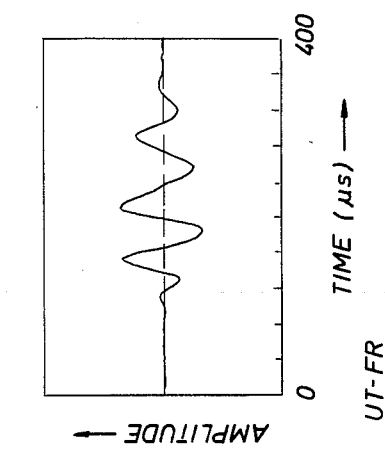
Figure 10C:
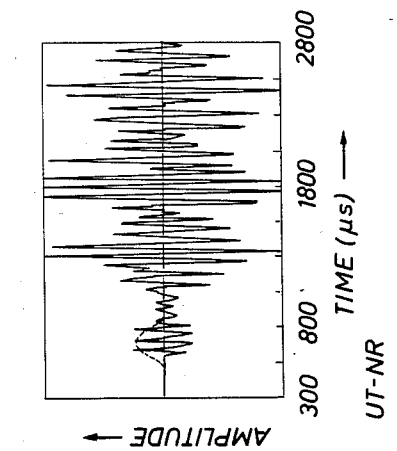
Figure 10D:
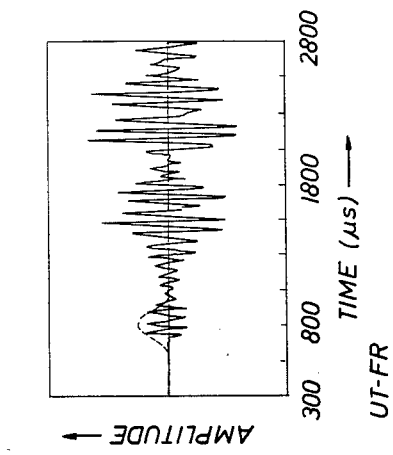

In the UTNR-UTFR example being considered, the Hanning window function is positioned on the waveforms as shown in FIGS. 10a and 10c. The windowed, preshifted waveforms are shown in FIGS. 10b and 10d. Note that these waveforms are almost aligned in time.

A spectral analysis is performed on both windowed, preshifted waveforms in the pair using the Discrete Fourier Transform (DFT). The DFT computes sample values of the spectrum at equally spaced frequencies from 0 Hz to a maximum frequency equal to one-half the sampling rate in Hz. These complex valued samples are separated by the maximum frequency divided by the number of computed frequencies. In mathematical terms, the DFT is stated as $$X(f_k) = \sum_{i=1}^{N} x(t_i) \exp(-2\pi(i-1)k/N) \tag{6}$$

where $X(f_k)$ is the DFT component at frequency $f_k$ and $x(t_i)$ is the windowed waveform sample at time $t_i$. The DFT requires the same number of waveform samples as frequencies being computed (N). Therefore, the windowed waveform is extended beyond its normal end with zero values to satisfy this condition.

Figure 11B:
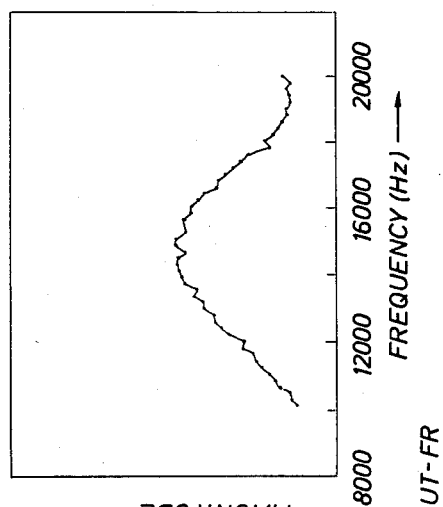
FIGS. 11a-11b show the frequency spectral component magnitudes of the windowed waveforms of FIG. 10 resulting from the Discrete Fourier Transform spectral analysis thereof.
Figure 11A:
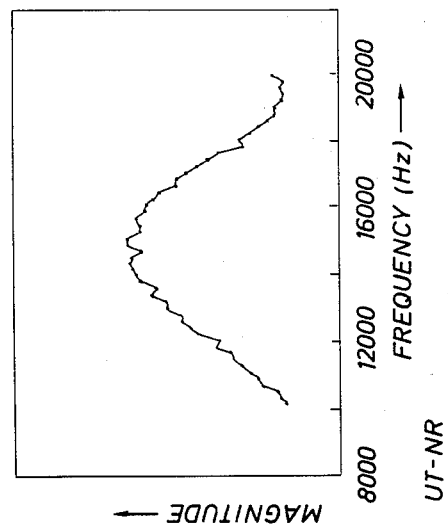

Typically, 512 frequency components are computed. In the example where the sampling interval is 5 μS, the 512 spectral samples cover 0–100 kHz in increments of approximately 195 Hz. All frequency components in the 10 kHz to 20 kHz band are retained for further analysis. FIGS. 11a and 11b illustrate the magnitudes of the DFT spectral components of both windowed waveforms in this band.

Figure 12B:
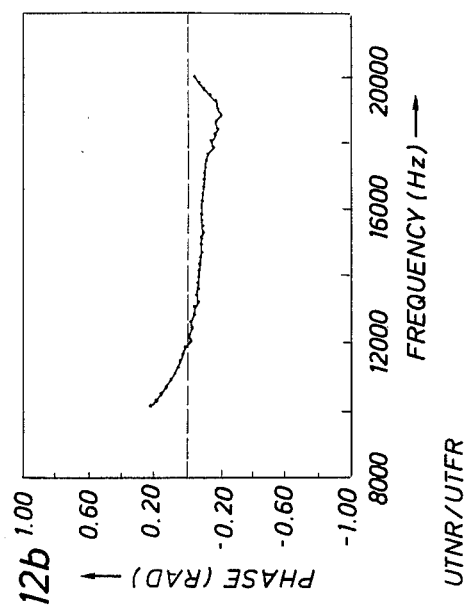
FIGS. 12a-12b illustrate the cross-spectral magnitude and phase, respectively, of the two waveforms in FIG. 11.
Figure 12A:
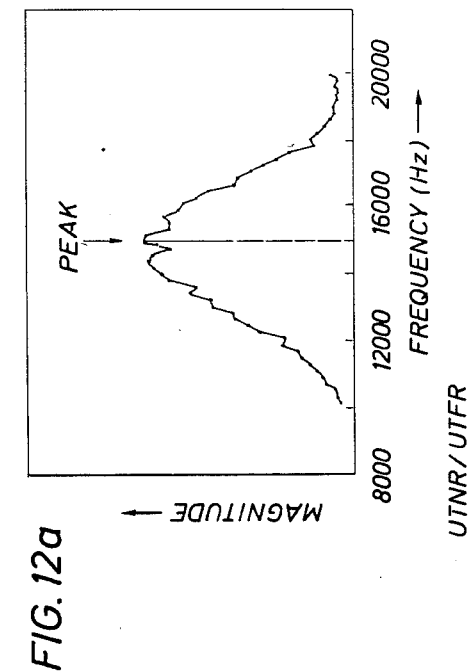

Next, values of the cross-spectrum of the two windowed waves are determined at each frequency in the 10 kHz to 20 kHz band. At each frequency, the cross-spectrum value is computed as the product of the DFT sample of the near wave with the conjugate of the far wave DFT sample. In equation form, this is $$C(f_k) = X_{near}(f_k) X^*_{far}(f_k) \tag{7}$$

where the * indicates conjugation. This complex cross-spectrum in its polar form has a magnitude value and a phase value for each frequency. The magnitude is the product of the DFT component magnitudes and the phase is the difference in the phase of the near and far components. FIGS. 12a and 12b show the cross-spectral magnitude and phase for the windowed UTNR-UTFR waveforms.

The phase of the cross-spectrum reflects the amount of time misalignment in the frequency components of the two windowed waves. Since the windowed waves are preshifted, this misalignment is small, probably less than one sample interval. The remaining time difference computed from phase is used to correct the first arrival $\Delta t_c$ estimate.

Figure 13:
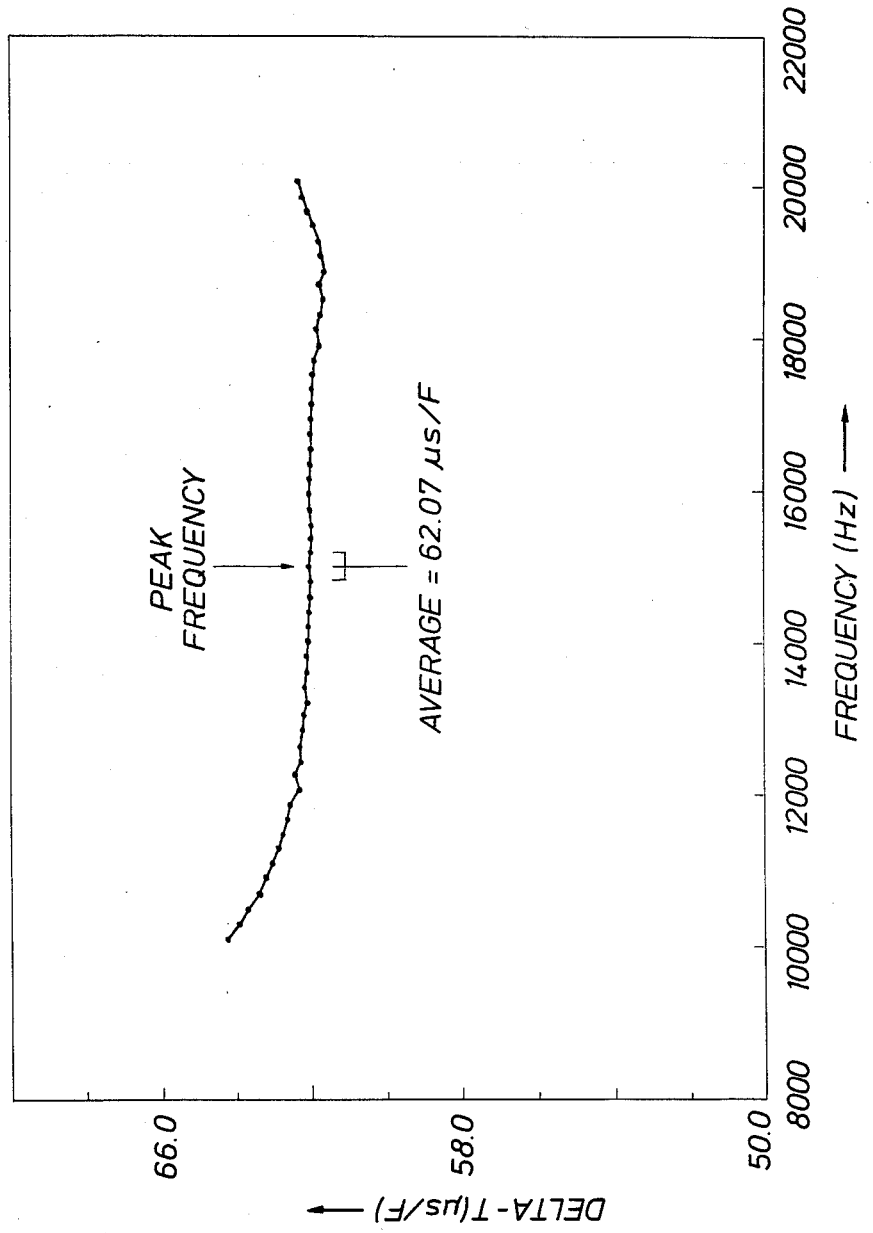
FIG. 13 shows $\Delta t_c$ computed for each frequency from the phase results shown in FIG. 12b.

For each frequency component, $f_k$, in the 10 kHz-20 kHz band, the correct $\Delta t_c$ is given as $$\Delta t_c(f_k) = \Delta t_{c1st} + \phi(f_k)/(2\pi f_k S) \tag{8}$$

where $\phi(f_k)$ is the cross-spectral phase (component phase difference), and S is two-feet, the difference in transmitter-receiver spacings of the two waveforms. This is illustrated for the example in FIG. 13. The three specific $\Delta t_c(f_k)$ values at the three frequencies around the cross-spectral magnitude peak are then averaged to give the final estimate for $\Delta t_c$. As indicated in FIG. 13, the final estimate in the example is 62.07 μS/ft.

This estimate is next tested for acceptability. First of all, it must be greater in value than 38 μS/ft. It must differ from $\Delta t_{c1st}$ by less than 1.5 times the sampling interval. This corresponds to residual misalignment in the windowed waves of less than three sampling intervals. To be accepted, at least two of the following three additional conditions must be met for the kth depth:

1. $\Delta t_c$ differs from the $\Delta t_c$ value from the k-1 processed depth by less than 35 μS/ft.
2. $\Delta t_c$ differs from the $\Delta t_c$ value from the k-2 processed depth by less than 40 μS/ft.
3. $\Delta t_c$ differs from the 66 $t_c$ value from the k-3 processed depth by less than 50 μS/ft.

If no acceptable value for $\Delta t_c$ results, the specific waveform pair will not contribute to the final borehole compensated $\Delta t_c$. In such a case, or if the estimate is greater than 120 μS/ft., the shear calculations for the pair will be skipped altogether. Otherwise, the following steps are carried out to obtain a shear estimate.

In the first step, the near waveform is windowed starting 150 μS past first arrival and ending at the expected fluid wave arrival time. The fluid wave is assumed to be traveling 200 μS/ft., so its expected arrival time is simply 200 μS/ft. times the transmitter-receiver spacing. The Hanning window function of equation (5) is again used resulting in a preshifted waveform. Should the windowed waveform duration be less than 135 μS, however, no further shear analysis for the waveform pair is attempted for lack of sufficient wave duration for accurate estimation. Thus no shear estimate will be produced.

Figure 14B:
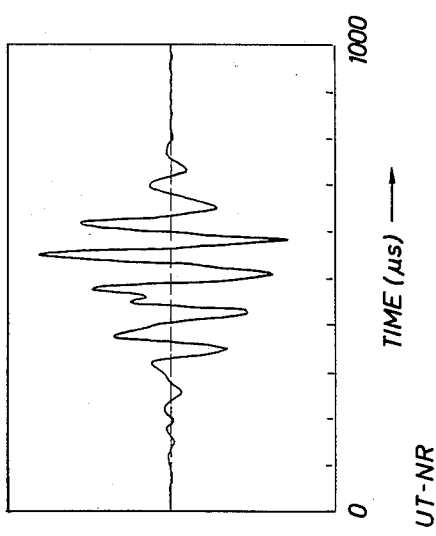
FIGS. 14a-14b illustrate windowing of the near receiver waveform for shear.
Figure 14A:
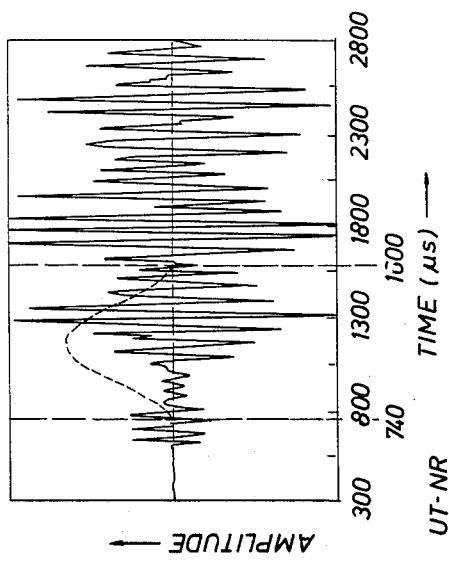

For the UTNR example from pair 1, first arrival was determined to be at 590 μS, so the window starts at 740 μS. The UTNR spacing is 8 ft., which means a fluid wave arrival time of 1600 μS. Thus the window starts and ends at 740 μS and 1600 μS, respectively. FIGS. 14a–14b show the near wave window and its placement on the waveform as well as the windowed, preshifted wave.

Figure 15B:
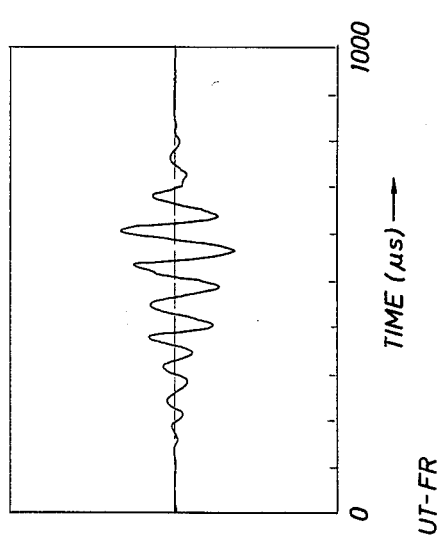
FIGS. 15a-15b show windowing of the far waveform, similar to windowing of the near waveform in FIGS. 14a-14b, but moved out relative to the near waveform.
Figure 15A:
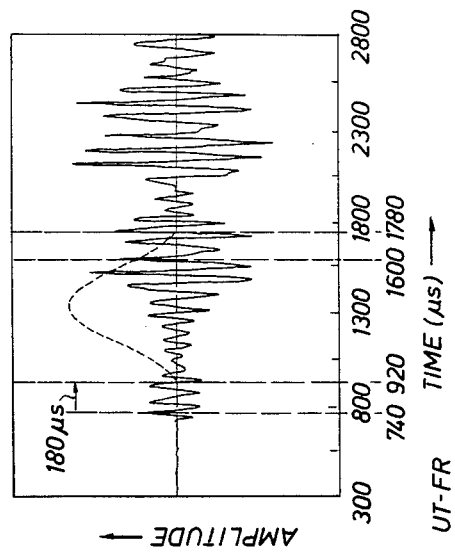

Since there is no first arrival indication for the shear wave, a sequence of window positions is used for the far waveform in an attempt to align the near and far windowed waveforms. To start, the window function for the near waveform is moved out in time by $1.42 \cdot \Delta t_{c1st} \cdot S$, where S is the two-foot difference in transmitter-receiver spacings for the pair. It is then used to window the far waveform. This moveout time corresponds to the earliest time a shear wave can arrive at the far receiver relative to the near. If this moveout time does not correspond to an integral multiple of the sampling interval, it is first rounded to be so. For the UTFR waveform example, this initial moveout is $1.42 \cdot (62.5 \mu S/ft.) \cdot (2 ft.) = 177.5$ μS, which rounded to the nearest 5 μS is 180 μS. Thus the window begins at 920 μS and ends at 1780 μS for the UTFR waveform. This is illustrated in FIG. 15 along with the windowed, preshifted wave.

Figure 16:
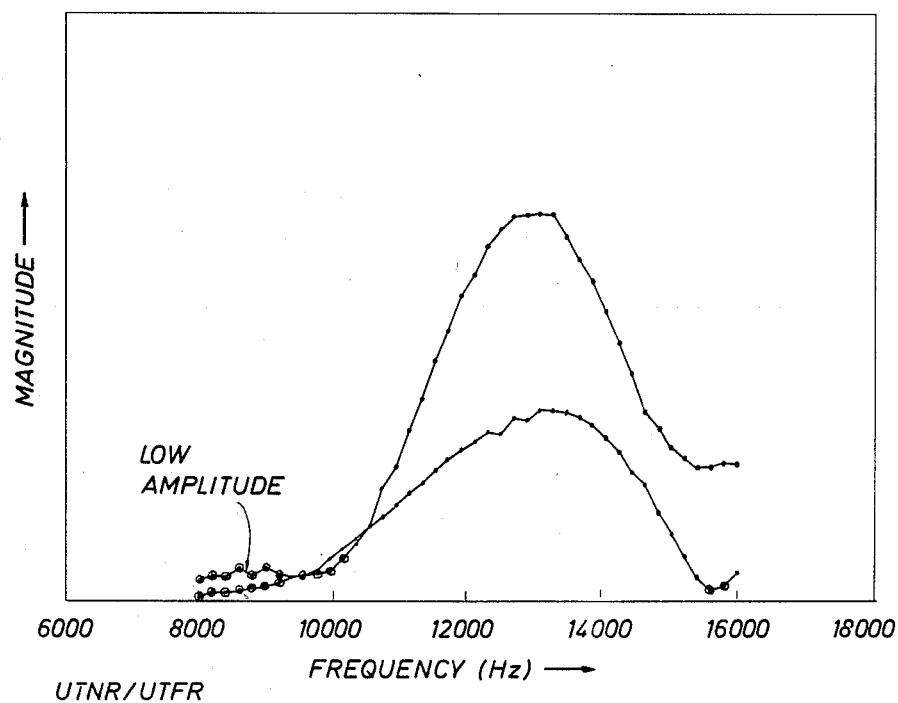
FIG. 16 shows the Discrete Fourier Transform spectral magnitudes obtained from the near receiver waveform, and from the moved-out windowed far receiver waveform (FIGS. 15a-15b)

Samples of the frequency spectra of the two windowed, preshifted waveforms are computed next with the DFT. The DFT order, N, in equation (6) is the same as is used with the compressional analysis, and, of course, the windowed waveforms must be extended with zero values to be of length N. All components in the shear frequency band of interest are retained. This band is 8 kHz to 16 kHz unless otherwise specified. Frequencies in this band for which the near or far DFT spectral component magnitude is less than one tenth its respective peak are denoted as low amplitude components These are later removed from consideration. FIG. 16 shows the DFT spectral magnitudes obtained from the windowed waveforms in FIGS. 14 and 15 with the low amplitude frequencies encircled.

Figure 17A:
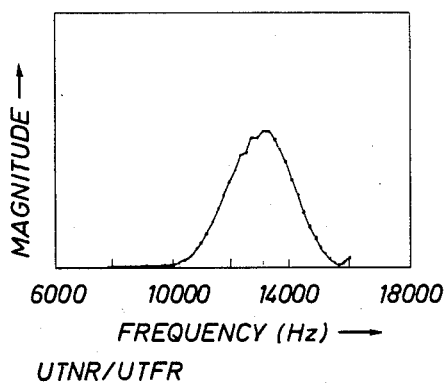
FIGS. 17a-17b show the cross spectral magnitude and phase, respectively, for the window moveout illustrated in FIGS. 15-16.
Figure 17B:
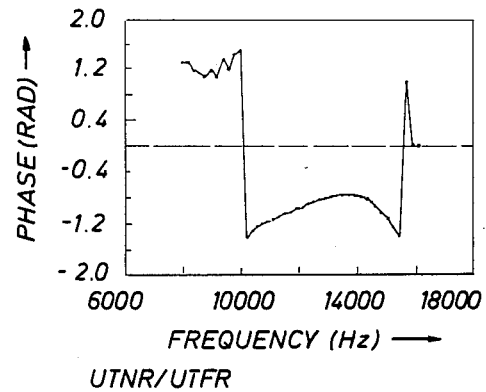

The near-far windowed waveform cross-spectrum is then determined using equation (7) in the same manner as for compressional analysis. Any additional frequency components whose cross-spectral magnitudes are less than one hundredth of the cross-spectral peak magnitude are likewise marked as low amplitude components. The cross-spectral phase is retained for later analysis. The cross-spectrum (cross-spectral magnitude and cross-spectral phase) for the example are plotted in FIGS. 17a–17b.

Next, the far waveform is rewindowed, again using the near wave's window, but with an increased moveout time of $1.52 \cdot \Delta t_{c1st} \cdot S$, where S is two-feet as before. The DFT spectrum is computed for the rewindowed, preshifted far waveform, and the cross-spectrum is recomputed. Any low DFT or cross-spectral magnitude frequencies are noted and the cross-spectral phase is again retained.

In the example, the new moveout is $1.52 \cdot (62.5 \mu S/ft.) \cdot (2 ft.) = 191$ μS, which rounded to the nearest 5 μS is 190 μS. Thus the window starts at 930 μS and ends at 1790 μS on the far waveform. The new UTNRUTFR cross-spectrum is given in FIGS. 18a–28b.

The process of rewindowing and recomputing DFT and cross-spectra is repeated for window moveout factors of 1.62, 1.72, 1.82, 1.92, 2.02, 2.12, and 2.22, each moveout being rounded to the nearest sampling time. Each time, phase is retained and low amplitude frequencies are noted. The final moveout factor of 2.22 corresponds to the latest expected shear arrival time in the far waveform relative to the near.

For the example, the rounded moveouts correspond to 205, 215, 230, 240, 255, 265, and 280 μS. The cross-spectra for moveouts of 230, 240, and 280 μS are shown in FIGS. 19, 20, and 21, respectively.

In the next step, all the phases retained in each window moveout step are examined. Specifically, the phase of each frequency component is examined versus window moveout. Moveouts where the phase is zero imply perfect time alignment (no time shift) of that frequency's component in the near and far waveforms. Thus, this moveout time divided by the 2 ft. spacing is a likely candidate for $\Delta t_s$ for that component.

As shown in FIGS. 22a–22b for the 11,914 Hz and 15,820 Hz components of the example, zero phase in general does not coincide with one of the above window moveouts. Hence, the actual moveout producing zero phase must be interpolated from the phase versus moveout data. The interpolation equation for zero-phase moveout $M_{0\,phase}$ is $$M_{0\,phase} = M_L - \phi_L(M_H - M_L)/(\phi_H - \phi_L) \qquad (9)$$

where $\phi_L$ is the phase at the moveout $M_L$ just lower than the zero-phase moveout and $\phi_H$ is the phase at the moveout $M_H$ just higher. A plot of zero-phase moveouts determined in this manner is given in FIG. 23 for the example being developed. Note that the last two frequencies, 15,820 Hz and 16,015 Hz, have two zero-phase moveouts. In general there may be as many as three.

To determine the best far moveout for final $\Delta t_s$ determination, all the low amplitude frequencies are first removed from consideration. The object is to find, among the remaining frequencies, a sub-band in which all the frequency components align at approximately the same moveout. The band must be at least 600 Hz wide, and it must be contiguous.

The search begins with the lowest frequency and proceeds through the higher frequency samples. When the difference in zero-phase moveouts between two consecutive frequencies is less than three percent of $\Delta t_{c1st}$, these points can be included in the band. These two are then averaged for the next comparison. If the next frequency's moveout value differs from this average by less than three percent of $\Delta t_{c1st}$, it too may be included in the band. Its moveout value is then summed with the previous average and the sum divided by two to form a new average for the next comparison. This continues to the next higher frequency, then the next, until the difference exceeds three percent of $\Delta t_{c1st}$. The resulting sub-band is, therefore, a band of frequencies with consistent zero-phase moveouts. Should no band at least 600 Hz wide be found, the remaining steps are omitted and no shear estimate for the specific waveform pair is determined.

Assuming a band is found, the frequency corresponding to its center is selected as the shear frequency for the final step. The zero-phase moveout for that frequency is taken as the best far window moveout for the final analysis.

Within the band whose spectral amplitudes are not too low lies the consistent sub-band indicated in FIG. 24. The sub-band extends from 10,547 Hz to 14,553 Hz. Its center is 12,500 Hz and the zero-phase moveout at this frequency is 237.5 μS. The moveout will be rounded to 240 μS for the final analysis.

In the concluding steps, the final far window moveout value is first rounded to the nearest sampling time and then used to rewindow the far waveform. The entire process of determining the far DFT spectrum and the near-far cross-spectrum is repeated. As for the compressional (cf. equation 8 and FIG. 13), the $\Delta t_s$ value for each frequency is calculated from the cross-spectral phase using the equation $$\Delta t_s(f_k) = (M_{final} + \phi(f_k)/2\pi f_k)/S \quad (10)$$

where $\phi(f_k)$ is the cross-spectral phase, $M_{final}$ is the final rounded moveout value, and S is two-feet. In the last step, the final $\Delta t_s$ value is computed as the average of the three $\Delta t_s$ values around the center-band shear frequency.

Figure 20B:
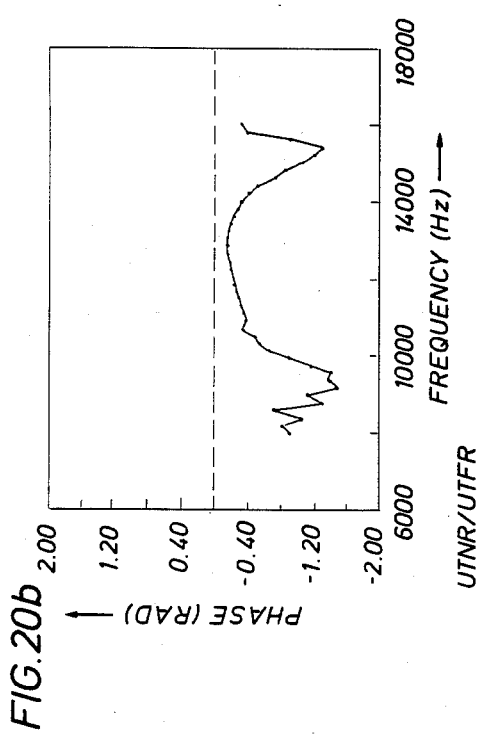
Figure 21B:
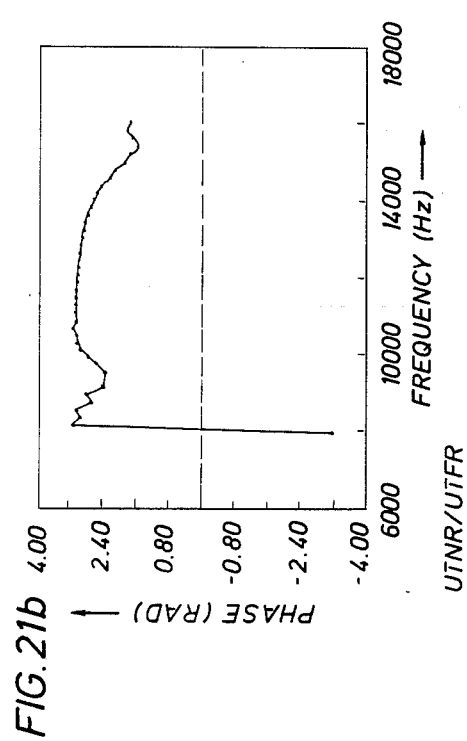
Figure 20A:
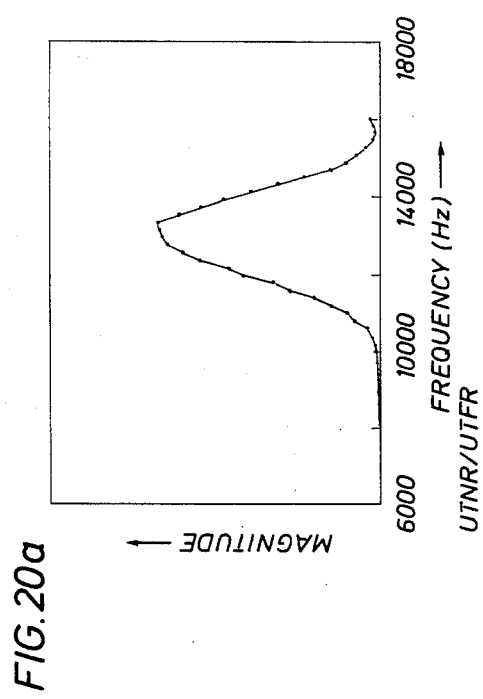
Figure 21A:
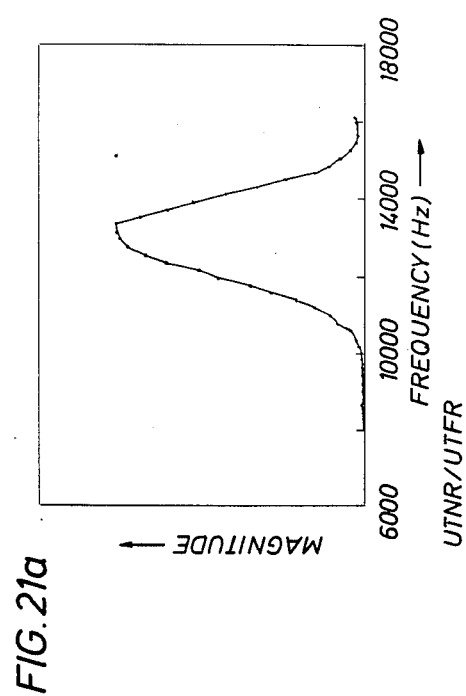
Figure 25:
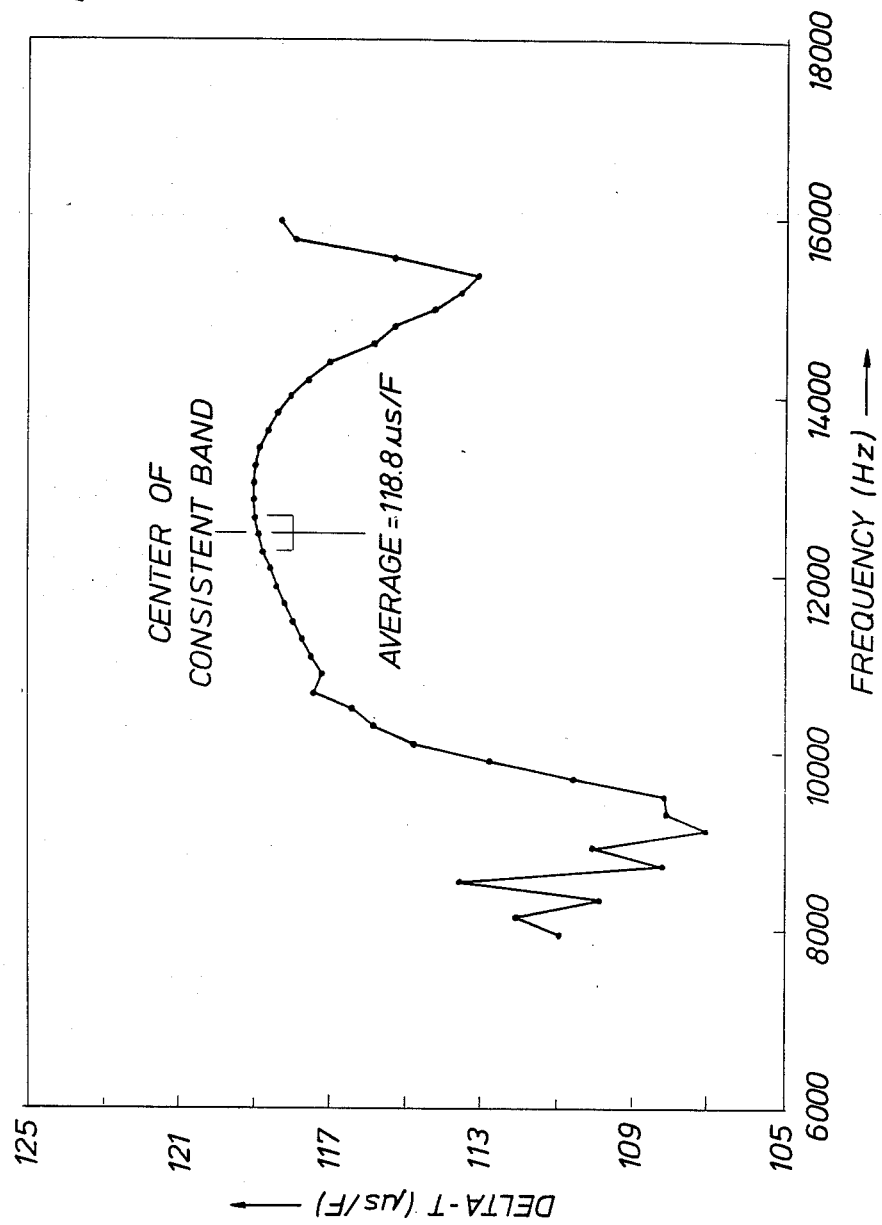
FIG. 25 shows final $\Delta t_s$ determination.

For the example, the cross-spectrum for the 240 μS moveout is shown in FIGS. 20a and 20b. The $\Delta t_s$ ($f_k$) values are plotted in FIG. 25. The final $\Delta t_s$ estimate is 118.8 μS/ft.

In the last step of the process, the $\Delta t_s$ estimate is tested for acceptability. If it is lower than $1.42 \cdot \Delta t_c$ or larger than $2.12 \cdot \Delta t_c$, it is not accepted. In any case, if it is greater than 200 μS/ft., it is rejected. As for compressional, rejection implies there will be not $\Delta t_s$ estimate from the specific pair being considered. Other pairs may produce estimates from the same depth from which a borehole compensated value can be determined.

The final results of the direct phase determination method are depth-derived borehole compensated $\Delta t_c$ and $\Delta t_s$ values for each depth. To form a borehole compensated measurement, at least one 2-receiver value (pair 1 and/or 2) at a given depth must be combined with at least one 2-transmitter value (pair 3 and/or 4) taken with the tool 9.5 ft. higher in the hole. The first step is to average the available $\Delta t_c$ and $\Delta t_s$ values from the pairwise analysis. If any of the pair $\Delta t_c$ values differ by more than 20 μS/ft. from the $\Delta t_c$ average, they are discarded. Similarly, if a $\Delta t_s$ value differs from its average by 40 μS/ft. or more, it is discarded.

The remaining $\Delta t_c$ values are combined for depth-derived borehole compensation according to the number remaining. The same is separately done for $\Delta t_s$. In each case, if all four $\Delta t$ values (compressional or shear) remain, the depth-derived borehole compensated $\Delta t$ value is computed as their average. If three remain, however, two will be 2-transmitter values and one a 2-receiver value, or vice-versa. In the former case, the 2-transmitter value closest in value to the average $\Delta t$ computed in the first step is averaged with the available 2-receiver value. Similarly, in the latter the closest 2-receiver value is averaged with the 2-transmitter value. If only one 2-transmitter and one 2-receiver value remain, they are averaged. In all other cases, no borehole compensated $\Delta t$ values can be computed. Should this be the case, the depth-derived borehole compensated value at the last depth processed is again used.

While a preferred embodiment has been described above, it will be readily apparent to those skilled in the art, upon reading the present invention, that numerous variations may be made within the scope thereof. For example, other forms of frequency analysis than the Discrete Fourier Transform, such as the Walsh Transform, may be used. Likewise, the compressional waves can be located by techniques other than first motion detection. With regard to the contiguous frequency bands, specific frequencies in the contiguous band can be rejected, for special reasons, while leaving the band still substantially contiguous (although technically now composed of two or more adjacent bands each of contiguous frequencies). Finally, although the compressional wave analysis was described above in terms of $\Delta t$ estimates as in equations (3) and (8), and the shear wave analysis was described in terms of moveout M in equation (9), the two approaches are equivalent as illustrated in equation (10).

What is claimed is:

1. A method for determining the acoustic compressional and shear wave propagation velocities of waveforms transmitted through earth formations by an acoustic borehole logging tool having at least three serially spaced acoustic transducers, at least one of the transducers being an acoustic pulse transmitter and the remainder of the transducers being acoustic receivers, comprising:
   (a) generating waveform outputs representative of the acoustic waves, from the logging tool acoustic pulses, propagated through different lengths of substantially the same formation intervals, and between different respective transmitter/receiver pairs, the waveforms being displaced in time according to their differential propagation times and rates therethrough,
   (b) locating at least a portion of a compressional wave in the waveform outputs,
   (c) identifying, from the waveform outputs at least two of the pairs, at least one substantially contiguous frequency band of consistent zero phase time moveouts for shear wave windows about at least portions of one of the waveforms,
   (d) specifying from at least one of the contiguous frequency bands a final shear window time moveout, and
   (e) combining the transducer spacings, compressional wave portion locations, and final shear window time moveout to determine the compressional and shear wave propagation velocities of the earth formations.

2. A method for determining the acoustic compressional and shear wave propagation velocities of waveforms transmitted through earth formations by an acoustic borehole logging tool having at least three serially spaced acoustic transducers, at least one of the transducers being an acoustic transmitter and the remainder of the transducers being acoustic receivers, comprising:
   (a) generating waveform outputs representative of the acoustic waves, from the logging tool acoustic pulses, propagated through different lengths of substantially the same formation intervals, and between different respective transmitter/receiver pairs, the waveforms being displaced in time according to their differential propagation times and rates therethrough,
   (b) locating at least a portion of the compressional waves in the waveform outputs,
   (c) windowing one of the waveform outputs, from one of the pairs, for at least a portion of the expected shear waves therein,
   (d) windowing the other waveform output from the other transmitter/receiver pair with at least two known window time moveouts substantially within the time interval between the expected shear first arrival and fluid wave arrival times of the other waveform, (e) computing the frequency spectra of both windowed waveforms at each window, (f) determining the time moveouts which give a cross spectral phase of zero for each frequency, (g) identifying at least one substantially contiguous frequency band of consistent zero phase time moveouts and specifying therefrom a final shear window time moveout, and (h) combining the transducer spacings, compressional wave portion locations, and final shear window time moveout to determine the compressional and shear wave propagation velocities of the earth formations.

3. The method of claim 2 wherein step (b) further comprises determining, from the waveform outputs, the arrival times of the compressional waves therein.

4. The method of claim 3 further comprising:

(a) identifying an interval of expected first compressional wave arrival, (b) detecting a known occurrence in at least one of the waveforms to determine coarse compressional wave first arrival times for each waveform, (c) windowing the waveform outputs from at least two of the transmitter/receiver pairs in the vicinity of the respective coarse compressional wave first arrival times, (d) computing the frequency spectra of the windowed compressional waveforms, and (e) using the resulting compressional cross-spectral phase to refine and determine a final arrival time for the compressional waves.

5. The method of claim 2 wherein step (e) further comprises computing the frequency spectra using the Discrete Fourier Transform.

6. The method of claim 2 wherein the frequency spectrum of each waveform is computed immediately after the waveform is windowed and prior to another windowing.

7. The method of claim 2 wherein step (d) further comprises windowing the waveform at a plurality of substantially equally distributed window time moveouts extending from substantially the earliest possible computed first shear wave arrival to substantially the earlier of the latest possible computed shear wave arrival time and the earliest expected fluid wave arrival time.

8. The method of claim 2, 3, 4, 5, 6, or 7 wherein step (f) of claim 2 further comprises:

(a) for both of the windowed waves, at each frequency, computing the cross-spectrum value as the product of the Discrete Fourier Transform sample of one of the waves with the conjugate of the other, and (b) interpolating zero phase from the phase versus time moveout data for a plurality of the higher energy frequency components produced by the Discrete Fourier Transform.

9. The method of claim 2, 3, 4, 5, 6 or 7 wherein step (g) of claim 2 further comprises:

(a) identifying a sub-band in which all the zero phase frequency components align at substantially the same time moveout, (b) selecting the moveout of the center frequency component from this sub-band as a best shear window time moveout, (c) rounding the best shear window time moveout to the nearest actual sampling time, (d) rewindowing the other waveform output with the rounded best window time moveout, (e) determining the Discrete Fourier Transform spectrum of the rewindowed waveform, (f) determining the cross-spectrum of the two waveforms, (g) using the cross-spectral phases for each frequency to define a refined best time moveout for each frequency, and (h) specifying a final shear window time moveout from at least one of the refined best time moveouts around the center of the same sub-band.

10. A method for measuring and determining the acoustic compressional and shear wave propagation velocities of waveforms transmitted through earth formations by an acoustic borehole logging tool having at least three serially spaced acoustic transducers, at least one of the transducers being an acoustic pulse transmitter and the remainder of the transducers being acoustic pulse receivers, comprising:

(a) generating waveform outputs representative of the acoustic waves, from the logging tool acoustic pulses, propagated through different lengths of substantially the same formation intervals, and between different respective transmitter/receiver pairs, the waveforms being displaced in time according to their differential propagation times and rates therethrough, (b) identifying an interval of expected first compressional wave arrival, (c) detecting a known occurrence in at least one of the waveforms to determine coarse compressional wave first arrival times for each waveform, (d) windowing the waveform outputs from at least two of the transmitter/receiver pairs in the vicinity of the respective coarse compressional wave first arrival times, (e) computing the frequency spectra of the windowed compressional waveforms, (f) using the resulting compressional cross-spectral phase to refine and determine a final arrival time for the compressional waves, (g) windowing one of the waveform outputs, from one of the pairs, for at least a portion of the expected shear waves therein, (h) windowing the other waveform output from the other transmitter/receiver pair at a plurality of substantially equally distributed window time moveouts extending from substantially the earliest possible computer first shear wave arrival to substantially the earlier of the latest possible computed shear wave arrival time and the earliest expected fluid wave arrival time, (i) computing the frequency spectra of the windowed waveforms, using the Discrete Fourier Transform, immediately after each waveform is windowed and prior to another windowing, (j) for both of the windowed waves, at each frequency, computing the cross-spectrum value as the product of the Discrete Fourier Transform sample of one of the waves with the conjugate of the other, (k) interpolating zero phase from the phase versus time moveout data for at least a plurality of the higher energy frequency components produced by the Discrete Fourier Transform to determine the time moveouts which give cross-spectral phase of zero for each frequency, (l) identifying a substantially contiguous frequency sub-band in which all the zero phase frequency components align consistently at substantially the same time moveout, (m) selecting the time moveout of the center frequency component from this sub-band as a best shear window time moveout, (n) rounding the best shear window time moveout to the nearest actual sampling time, (o) rewindowing the other waveform output with the rounded best window time moveout, (p) determining the Discrete Fourier Transform spectrum of the rewindowed waveform, (q) determining the cross-spectrum of the two waveforms, (r) using the cross-spectral phases for each frequency to define a refined best time moveout for each frequency, (s) specifying a final shear window time moveout from at least one of the refined best time moveouts around the center of the same sub-band, and (t) combining the transducer spacings, compressional arrival time, and final shear window time moveout to determine the compressional and shear wave propagation velocities of the earth formations.

11. A borehole logging system for determining the acoustic compressional and shear wave propagation velocities of waveforms transmitted through earth formations, comprising:

(a) an acoustic borehole logging tool having at least three serially spaced acoustic transducers, at least one of said transducers being an acoustic pulse transmitter and the remainder of said transducers being acoustic receivers, (b) means for generating waveform outputs representative of the acoustic waves, from the logging tool acoustic pulses, propagated through different lengths of substantially the same formation intervals, and between different respective transmitter/receiver pairs, the waveforms being displaced in time according to their differential propagation times and rates therethrough, (c) means for locating at least a portion of a compressional wave in the waveform outputs, (d) means for identifying, from the waveform outputs from at least two of the pairs, at least one substantially contiguous frequency band of consistent zero phase time moveouts for shear wave windows about at least portions of one of the waveforms, (e) means for specifying from at least one of the contiguous frequency bans a final shear window time moveout, and (f) means for combining the transducer spacings, compressional wave portion locations, and final shear window time moveout to determine the compressional and shear wave propagation velocities or the earth formations.

12. A borehole logging system for determining the acoustic compressional and shear wave propagation velocities of waveforms transmitted through earth formations, comprising:

(a) an acoustic borehole logging tool having at least three serially spaced acoustic transducers, at least one of said transducers being an acoustic pulse transmitter and the remainder of said transducers being acoustic receivers, (b) means for generating waveform outputs representative of the acoustic waves, from the logging tool acoustic pulses, propagated through different lengths of substantially the same formation intervals, and between different respective transmitter/receiver pairs, the waveforms being displaced in time according to their differential propagation times and rates therethrough, (c) means for locating at least a portion of the compressional waves in the waveform outputs, (d) means for windowing one of the waveform outputs, from one of the pairs, for at least a portion of the expected shear waves therein, (e) means for windowing the other waveform output from the other transmitter/receiver pair with at least two known window time moveouts substantially within the time interval between the expected shear first arrival and fluid wave arrival times of the other waveform, (f) means for computing the frequency spectra of the windowed waveforms, (g) means for determining the time moveouts which give a cross spectral phase of zero for each frequency, (h) means for identifying at least one substantially contiguous frequency band of consistent zero phase time moveouts and specifying therefrom a final shear window time moveout, and (i) means for combining the transducer spacings, compressional wave portion locations, and final shear window time moveout to determine the compressional and shear wave propagation velocities of the earth formations.

13. The borehole logging system of claim 12 wherein said means for locating at least a portion of the compressional waves in the waveform outputs further comprises means for determining, from the waveform outputs, the arrival times of the compressional waves therein.

14. The borehole logging system of claim 13 wherein said means for determining the arrival times of the compressional waves further comprises:

(a) means for identifying an interval of expected first compressional wave arrival, (b) means for detecting a known occurrence in at least one of the waveforms to determine coarse compressional wave first arrival times for each waveform, (c) means for windowing the waveform outputs from at least two of the transmitter/receiver pairs in the vicinity of the respective coarse compressional wave first arrival times, (d) means for computing the frequency spectra of the windowed compressional waveforms, and (e) means for using the resulting compressional cross-spectral phase to refine and determine a final arrival time for the compressional waves.

15. The borehole logging system of claim 12 wherein said means for computing the frequency spectra of the windowed waveforms further comprises means for computing the frequency spectra using the Discrete Fourier Transform.

16. The borehole logging system of claim 12 wherein said means for computing the frequency spectra of the windowed waveforms computes each such spectrum immediately after the waveform is windowed and prior to another windowing.

17. The borehole logging system of claim 12 wherein said means for windowing the other waveform outputs further comprises means for windowing the waveform at a plurality of substantially equally distributed window time moveouts extending from substantially the earliest possible computed first shear wave arrival to substantially the earlier of the latest possible computed shear wave arrival time and the earliest expected fluid wave arrival time.

18. The borehole logging system of the claim 12, 13, 14, 15, 16 or 17 wherein said means for determining said zero phase time moveouts further comprises:
   (a) means for computing, for both of the windowed waves, at each frequency, the cross-spectrum value as the product of the Discrete Fourier Transform sample of one of the waves with the conjugate of the other, and
   (b) means for interpolating zero phase from the phase versus moveout data for a plurality of the higher energy frequency components produced by the Discrete Fourier Transform.

19. The borehole logging system of claim 12, 13, 14, 15, 16 or 17 wherein said means for identifying said at least one substantially contiguous band of zero phase time moveouts and specifying said final shear time moveout further comprises:
   (a) means for identifying a sub-band in which all the zero phase frequency components align at substantially the same time moveout,
   (b) means for selecting the time moveout of the center frequency component from this sub-band as a best shear window time moveout,
   (c) means for rounding the best shear window time moveout to the nearest actual sampling time,
   (d) means for rewindowing the other waveform output with the rounded best window time moveout,
   (e) means for determining the Discrete Fourier Transform spectrum of the rewindowed waveform,
   (f) means for determining the cross-spectrum of the two waveforms,
   (g) means for using the cross-spectral phases for each frequency to define a refined best time moveout for each frequency, and
   (h) means for specifying a final shear window time moveout from at least one of the refined best time moveouts around the center of the same sub-band.

20. A borehole logging system for measuring and determining the acoustic compressional and shear wave propagation velocities of waveforms transmitted through earth formations, comprising:
   (a) an acoustic borehole logging tool having at least three serially spaced acoustic transducers, at least one of said transducers being an acoustic pulse transmitter and the remainder of said transducers being acoustic receivers,
   (b) means for generating waveform outputs representative of the acoustic waves, from said logging tool acoustic pulses, propagated through different lengths of substantially the same formation intervals, and between different respective transmitter/receiver pairs, the waveforms being displaced in time according to their differential propagation times and rates therethrough,
   (c) means for identifying an interval of expected first compressional wave arrival,
   (d) means for detecting a known occurrence in at least one of the waveforms to determine coarse compressional wave first arrival times for each waveform,
   (e) means for windowing the waveform outputs from at least two of the transmitter/receiver pairs in the vicinity of the respective said coarse compressional wave first arrival times,
   (f) means for computing the frequency spectra of the windowed compressional waveforms,
   (g) means for using the resulting compressional cross-spectral phase to refine and determine a final arrival time for the compressional waves,
   (h) means for windowing one of the waveform outputs, from one of the pairs, for at least a portion of the expected shear waves therein,
   (i) means for windowing the other waveform output from the other transmitter/receiver pair at a plurality of substantially equally distributed window time moveouts extending from substantially the earliest possible computed first shear wave arrival to substantially the earlier of the latest possible computed shear wave arrival time and the earliest expected fluid wave arrival time,
   (j) means for computing the frequency spectra of the windowed waveforms, using the Discrete Fourier Transform, immediately after each waveform is windowed and prior to another windowing,
   (k) means for computing, for both of the windowed waves, at each frequency, the cross-spectrum value as the product of the Discrete Fourier Transform sample of one of the waves with the conjugate of the other,
   (l) means for interpolating zero phase from the phase versus time moveout data for at least a plurality of the higher energy frequency components produced by the Discrete Fourier Transform to determine the time moveouts which give cross-spectral phase of zero for each frequency,
   (m) means for identifying a substantially contiguous frequency sub-band in which all the zero phase frequency components align consistently at substantially the same time moveout,
   (n) means for selecting the time moveout of the center frequency component from this sub-band as a best shear window time moveout,
   (o) means for rounding the best shear window time moveout to the nearest actual sampling time,
   (p) means for rewindowing the other waveform output with the rounded best window time moveout,
   (q) means for determining the Discrete Fourier Transform spectrum of the rewindowed waveform,
   (r) means for determining the cross-spectrum of the two waveforms,
   (s) means for using the cross-spectral phases for each frequency to define a refined best time moveout for each frequency,
   (t) means for specifying a final shear window time moveout from at least one of the refined best time moveouts around the center of the same sub-band, and
   (u) means for combining the transducer spacings, compressional arrival time, and final shear window time moveout to determine the compressional and shear wave propagation velocities of the earth formations.

21. The method of claim 1 wherein the acoustic wave propagation velocities are compressional and shear, in step (b) the known type of wave is compresional, in step (c) the time moveouts are for shear wave windows, in step (d) the window time moveout is for shear, and in step (e) the wave portion locations are compressional and final window time moveout is for shear.

22. The system of claim 11 wherein the acoustic waves are compressional and shear, the known type of wave in (c) is compressional, the time moveout in (d) is for shear, the final window time moveout in (e) is for shear, and in (f) the wave portion location is compressional and final window time moveout is for shear.

* * * * *